US012307562B2

(12) United States Patent
Charlton et al.

(10) Patent No.: US 12,307,562 B2
(45) Date of Patent: May 20, 2025

(54) DEVICE LOCATION BASED ON MACHINE LEARNING CLASSIFICATIONS

(71) Applicant: Snap Inc., Santa Monica, CA (US)

(72) Inventors: Ebony James Charlton, London (GB); Sumant Hanumante, Fremont, CA (US); Zhou Ren, Bellevue, WA (US); Dhritiman Sagar, New York, NY (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/741,615

(22) Filed: Jun. 12, 2024

(65) Prior Publication Data
US 2024/0331244 A1 Oct. 3, 2024

Related U.S. Application Data

(63) Continuation of application No. 18/234,226, filed on Aug. 15, 2023, now Pat. No. 12,039,648, which is a (Continued)

(51) Int. Cl.
G06F 18/24 (2023.01)
G06F 18/22 (2023.01)
(Continued)

(52) U.S. Cl.
CPC .............. *G06T 11/60* (2013.01); *G06F 18/22* (2023.01); *G06F 18/24* (2023.01); *G06V 10/764* (2022.01); *G06V 10/82* (2022.01); *G06V 20/20* (2022.01); *G06V 20/35* (2022.01); *G06V 20/36* (2022.01); *G06V 20/38* (2022.01); *G06V 20/70* (2022.01); *H04L 51/222* (2022.05);
(Continued)

(58) Field of Classification Search
None
See application file for complete search history.

(56) References Cited

U.S. PATENT DOCUMENTS 5,754,939 A 5/1998 Herz et al.
6,038,295 A 3/2000 Mattes
(Continued)

FOREIGN PATENT DOCUMENTS

CA 2887596 A1 7/2015
CN 105338479 A 2/2016
(Continued)

OTHER PUBLICATIONS

"U.S. Appl. No. 15/692,990, Notice of Allowance mailed Jan. 22, 2018", 9 pgs.
(Continued)

*Primary Examiner* — Ajit Patel
(74) *Attorney, Agent, or Firm* — Schwegman Lundberg & Woessner, P.A.

(57) ABSTRACT

A venue system of a client device can submit a location request to a server, which returns multiple venues that are near the client device. The client device can use one or more machine learning schemes (e.g., convolutional neural networks) to determine that the client device is located in one of specific venues of the possible venues. The venue system can further select imagery for presentation based on the venue selection. The presentation may be published as ephemeral message on a network platform.

20 Claims, 17 Drawing Sheets

Related U.S. Application Data continuation of application No. 17/354,356, filed on Jun. 22, 2021, now Pat. No. 11,803,992, which is a continuation of application No. 16/296,153, filed on Mar. 7, 2019, now Pat. No. 11,051,129, which is a continuation of application No. 15/967,201, filed on Apr. 30, 2018, now Pat. No. 10,264,422, which is a continuation of application No. 15/692,990, filed on Aug. 31, 2017, now Pat. No. 9,980,100.

(51) Int. Cl.

| | | |
|---|---|---|
| *G06T 11/60* | (2006.01) | |
| *G06V 10/764* | (2022.01) | |
| *G06V 10/82* | (2022.01) | |
| *G06V 20/00* | (2022.01) | |
| *G06V 20/20* | (2022.01) | |
| *G06V 20/70* | (2022.01) | |
| *H04L 51/222* | (2022.01) | |
| *H04W 4/021* | (2018.01) | |
| *H04W 4/029* | (2018.01) | |
| *H04W 4/21* | (2018.01) | |
| *H04W 4/33* | (2018.01) | |
| *H04L 51/52* | (2022.01) | |
| *H04W 88/02* | (2009.01) | |

(52) U.S. Cl.
CPC ............ *H04W 4/021* (2013.01); *H04W 4/029* (2018.02); *H04W 4/21* (2018.02); *H04W 4/33* (2018.02); *H04L 51/52* (2022.05); *H04W 88/02* (2013.01)

(56) References Cited

U.S. PATENT DOCUMENTS

| | | | |
|---|---|---|---|
| 6,158,044 A | 12/2000 | Tibbetts | |
| 6,167,435 A | 12/2000 | Druckenmiller et al. | |
| 6,205,432 B1 | 3/2001 | Gabbard et al. | |
| 6,310,694 B1 | 10/2001 | Okimoto et al. | |
| 6,484,196 B1 | 11/2002 | Maurille | |
| 6,487,586 B2 | 11/2002 | Ogilvie et al. | |
| 6,665,531 B1 | 12/2003 | Soderbacka et al. | |
| 6,701,347 B1 | 3/2004 | Ogilvie | |
| 6,711,608 B1 | 3/2004 | Ogilvie | |
| 6,757,713 B1 | 6/2004 | Ogilvie et al. | |
| 6,980,909 B2 | 12/2005 | Root et al. | |
| 7,124,164 B1 | 10/2006 | Chemtob | |
| 7,149,893 B1 | 12/2006 | Leonard et al. | |
| 7,173,651 B1 | 2/2007 | Knowles | |
| 7,243,163 B1 | 7/2007 | Friend et al. | |
| 7,278,168 B1 | 10/2007 | Chaudhury et al. | |
| 7,356,564 B2 | 4/2008 | Hartselle et al. | |
| 7,376,715 B2 | 5/2008 | Cunningham et al. | |
| 7,411,493 B2 | 8/2008 | Smith | |
| 7,478,402 B2 | 1/2009 | Christensen et al. | |
| 7,496,347 B2 | 2/2009 | Puranik | |
| 7,519,670 B2 | 4/2009 | Hagale et al. | |
| 7,535,890 B2 | 5/2009 | Rojas | |
| 7,607,096 B2 | 10/2009 | Oreizy et al. | |
| 7,703,140 B2 | 4/2010 | Nath et al. | |
| 7,912,896 B2 | 3/2011 | Wolovitz et al. | |
| 8,131,597 B2 | 3/2012 | Hudetz | |
| 8,170,957 B2 | 5/2012 | Richard | |
| 8,199,747 B2 | 6/2012 | Rojas et al. | |
| 8,214,443 B2 | 7/2012 | Hamburg | |
| 8,238,947 B2 | 8/2012 | Lottin et al. | |
| 8,244,593 B2 | 8/2012 | Klinger et al. | |
| 8,312,097 B1 | 11/2012 | Siegel et al. | |
| 8,332,475 B2 | 12/2012 | Rosen et al. | |
| 8,570,907 B2 | 10/2013 | Garcia, Jr. et al. | |
| 8,718,333 B2 | 5/2014 | Wolf et al. | |
| 8,724,622 B2 | 5/2014 | Rojas | |
| 8,745,132 B2 | 6/2014 | Obradovich | |
| 8,774,839 B2 | 7/2014 | Busch | |
| 8,874,677 B2 | 10/2014 | Rosen et al. | |
| 8,909,679 B2 | 12/2014 | Root et al. | |
| 8,909,714 B2 | 12/2014 | Agarwal et al. | |
| 8,909,725 B1 | 12/2014 | Sehn | |
| 8,914,752 B1 | 12/2014 | Spiegel | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,083,770 B1 | 7/2015 | Drose et al. | |
| 9,094,137 B1 | 7/2015 | Sehn et al. | |
| 9,100,806 B2 | 8/2015 | Rosen et al. | |
| 9,100,807 B2 | 8/2015 | Rosen et al. | |
| 9,113,301 B1 | 8/2015 | Spiegel et al. | |
| 9,148,424 B1 | 9/2015 | Yang | |
| 9,191,776 B2 | 11/2015 | Root et al. | |
| 9,204,252 B2 | 12/2015 | Root | |
| 9,225,805 B2 | 12/2015 | Kujawa et al. | |
| 9,225,897 B1 | 12/2015 | Sehn et al. | |
| 9,237,202 B1 | 1/2016 | Sehn | |
| 9,264,463 B2 | 2/2016 | Rubinstein et al. | |
| 9,276,886 B1 | 3/2016 | Samaranayake | |
| 9,294,425 B1 | 3/2016 | Son | |
| 9,385,983 B1 | 7/2016 | Sehn | |
| 9,396,354 B1 | 7/2016 | Murphy et al. | |
| 9,407,712 B1 | 8/2016 | Sehn | |
| 9,407,816 B1 | 8/2016 | Sehn | |
| 9,430,783 B1 | 8/2016 | Sehn | |
| 9,443,227 B2 | 9/2016 | Evans et al. | |
| 9,482,882 B1 | 11/2016 | Hanover et al. | |
| 9,482,883 B1 | 11/2016 | Meisenholder | |
| 9,489,661 B2 | 11/2016 | Evans et al. | |
| 9,491,134 B2 | 11/2016 | Rosen et al. | |
| 9,532,171 B2 | 12/2016 | Allen et al. | |
| 9,537,811 B2 | 1/2017 | Allen et al. | |
| 9,560,006 B2 | 1/2017 | Prado et al. | |
| 9,628,950 B1 | 4/2017 | Noeth et al. | |
| 9,652,896 B1 | 5/2017 | Jurgenson et al. | |
| 9,659,244 B2 | 5/2017 | Anderton et al. | |
| 9,693,191 B2 | 6/2017 | Sehn | |
| 9,705,831 B2 | 7/2017 | Spiegel | |
| 9,742,713 B2 | 8/2017 | Spiegel et al. | |
| 9,785,796 B1 | 10/2017 | Murphy et al. | |
| 9,825,898 B2 | 11/2017 | Sehn | |
| 9,854,219 B2 | 12/2017 | Sehn | |
| 9,961,520 B2 | 5/2018 | Brooks et al. | |
| 9,980,100 B1 | 5/2018 | Charlton et al. | |
| 10,255,525 B1 * | 4/2019 | Totolos, Jr. | B60W 30/09 |
| 10,264,422 B2 | 4/2019 | Charlton et al. | |
| 10,726,510 B2 | 7/2020 | Vanslette et al. | |
| 10,795,022 B2 * | 10/2020 | Shintani | H04N 13/128 |
| 11,051,129 B2 | 6/2021 | Charlton et al. | |
| 2002/0047868 A1 | 4/2002 | Miyazawa | |
| 2002/0144154 A1 | 10/2002 | Tomkow | |
| 2003/0052925 A1 | 3/2003 | Daimon et al. | |
| 2003/0126215 A1 | 7/2003 | Udell | |
| 2003/0217106 A1 | 11/2003 | Adar et al. | |
| 2004/0203959 A1 | 10/2004 | Coombes | |
| 2005/0097176 A1 | 5/2005 | Schatz et al. | |
| 2005/0198128 A1 | 9/2005 | Anderson | |
| 2005/0223066 A1 | 10/2005 | Buchheit et al. | |
| 2006/0242239 A1 | 10/2006 | Morishima et al. | |
| 2006/0270419 A1 | 11/2006 | Crowley et al. | |
| 2007/0038715 A1 | 2/2007 | Collins et al. | |
| 2007/0064899 A1 | 3/2007 | Boss et al. | |
| 2007/0073823 A1 | 3/2007 | Cohen et al. | |
| 2007/0214216 A1 | 9/2007 | Carrer et al. | |
| 2007/0233801 A1 | 10/2007 | Eren et al. | |
| 2008/0055269 A1 | 3/2008 | Lemay et al. | |
| 2008/0120409 A1 | 5/2008 | Sun et al. | |
| 2008/0207176 A1 | 8/2008 | Brackbill et al. | |
| 2008/0270938 A1 | 10/2008 | Carlson | |
| 2008/0306826 A1 | 12/2008 | Kramer et al. | |
| 2008/0313346 A1 | 12/2008 | Kujawa et al. | |
| 2009/0042588 A1 | 2/2009 | Lottin et al. | |
| 2009/0132453 A1 | 5/2009 | Hangartner et al. | |
| 2010/0082427 A1 | 4/2010 | Burgener et al. | |
| 2010/0131880 A1 | 5/2010 | Lee et al. | |
| 2010/0185665 A1 | 7/2010 | Horn et al. | |

(56) References Cited

U.S. PATENT DOCUMENTS

| | | |
|---|---|---|
| 2010/0306669 A1 | 12/2010 | Della Pasqua |
| 2011/0099507 A1 | 4/2011 | Nesladek et al. |
| 2011/0145564 A1 | 6/2011 | Moshir et al. |
| 2011/0202598 A1 | 8/2011 | Evans et al. |
| 2011/0213845 A1 | 9/2011 | Logan et al. |
| 2011/0286586 A1 | 11/2011 | Saylor et al. |
| 2011/0320373 A1 | 12/2011 | Lee et al. |
| 2012/0028659 A1 | 2/2012 | Whitney et al. |
| 2012/0184248 A1 | 7/2012 | Speede |
| 2012/0209921 A1 | 8/2012 | Adafin et al. |
| 2012/0209924 A1 | 8/2012 | Evans et al. |
| 2012/0254325 A1 | 10/2012 | Majeti et al. |
| 2012/0278692 A1 | 11/2012 | Shi |
| 2012/0304080 A1 | 11/2012 | Wormald et al. |
| 2013/0071093 A1 | 3/2013 | Hanks et al. |
| 2013/0102248 A1 | 4/2013 | Jay et al. |
| 2013/0194301 A1 | 8/2013 | Robbins et al. |
| 2013/0290443 A1 | 10/2013 | Collins et al. |
| 2013/0314214 A1 | 11/2013 | Leica et al. |
| 2014/0018095 A1 | 1/2014 | Parvizi et al. |
| 2014/0032682 A1 | 1/2014 | Prado et al. |
| 2014/0122787 A1 | 5/2014 | Shalvi et al. |
| 2014/0201527 A1 | 7/2014 | Krivorot |
| 2014/0282096 A1 | 9/2014 | Rubinstein et al. |
| 2014/0325383 A1 | 10/2014 | Brown et al. |
| 2014/0359024 A1 | 12/2014 | Spiegel |
| 2014/0359032 A1 | 12/2014 | Spiegel et al. |
| 2015/0199082 A1 | 7/2015 | Scholler et al. |
| 2015/0227602 A1 | 8/2015 | Ramu et al. |
| 2016/0034712 A1* | 2/2016 | Patton .................. G06Q 50/01 726/28 |
| 2016/0048298 A1 | 2/2016 | Choi |
| 2016/0085773 A1 | 3/2016 | Chang et al. |
| 2016/0085863 A1 | 3/2016 | Allen et al. |
| 2016/0086670 A1 | 3/2016 | Gross et al. |
| 2016/0099901 A1 | 4/2016 | Allen et al. |
| 2016/0180887 A1 | 6/2016 | Sehn |
| 2016/0275401 A1 | 9/2016 | Cao et al. |
| 2016/0277419 A1 | 9/2016 | Allen et al. |
| 2016/0321708 A1 | 11/2016 | Sehn |
| 2016/0323717 A1 | 11/2016 | Friday et al. |
| 2016/0359957 A1 | 12/2016 | Laliberte |
| 2016/0359987 A1 | 12/2016 | Laliberte |
| 2017/0031913 A1 | 2/2017 | Favreau-lessard et al. |
| 2017/0032186 A1 | 2/2017 | Murata et al. |
| 2017/0061308 A1 | 3/2017 | Chen et al. |
| 2017/0064515 A1 | 3/2017 | Heikkila et al. |
| 2017/0078845 A1 | 3/2017 | Wootton et al. |
| 2017/0109615 A1 | 4/2017 | Yatziv et al. |
| 2017/0161382 A1 | 6/2017 | Ouimet et al. |
| 2017/0222962 A1 | 8/2017 | Gauglitz et al. |
| 2017/0263029 A1 | 9/2017 | Yan et al. |
| 2017/0287006 A1 | 10/2017 | Azmoodeh et al. |
| 2017/0295250 A1 | 10/2017 | Samaranayake et al. |
| 2017/0295465 A1 | 10/2017 | Bitra et al. |
| 2017/0337404 A1 | 11/2017 | Rathus |
| 2017/0351713 A1 | 12/2017 | Chamberlain et al. |
| 2017/0366938 A1 | 12/2017 | Wootton et al. |
| 2017/0374003 A1 | 12/2017 | Allen et al. |
| 2017/0374508 A1 | 12/2017 | Davis et al. |
| 2018/0005142 A1 | 1/2018 | Meruani et al. |
| 2018/0012110 A1 | 1/2018 | Souche et al. |
| 2018/0032842 A1 | 2/2018 | Yellapragada et al. |
| 2018/0063062 A1 | 3/2018 | Burdakov |
| 2018/0080793 A1 | 3/2018 | Kapicioglu et al. |
| 2018/0124239 A1 | 5/2018 | Wei |
| 2018/0150715 A1 | 5/2018 | Chang et al. |
| 2018/0159979 A1 | 6/2018 | Amir et al. |
| 2018/0365278 A1* | 12/2018 | Klöhn .................. G06F 16/51 |
| 2019/0069147 A1 | 2/2019 | Charlton et al. |
| 2019/0297461 A1 | 9/2019 | Charlton et al. |
| 2019/0362130 A1 | 11/2019 | Othman et al. |
| 2021/0392465 A1 | 12/2021 | Charlton et al. |
| 2023/0386112 A1 | 11/2023 | Charlton et al. |

FOREIGN PATENT DOCUMENTS

| | | |
|---|---|---|
| CN | 105376831 A | 3/2016 |
| CN | 105653634 A | 6/2016 |
| CN | 106462598 A | 2/2017 |
| CN | 111226447 A | 6/2020 |
| CN | 111226447 B | 3/2022 |
| CN | 114615227 A | 6/2022 |
| EP | 3677056 B1 | 3/2022 |
| KR | 101115426 B1 | 3/2012 |
| KR | 102324699 B1 | 11/2021 |
| KR | 102445720 B1 | 9/2022 |
| WO | WO-2012000107 A1 | 1/2012 |
| WO | WO-2013008251 A2 | 1/2013 |
| WO | WO-2014194262 A2 | 12/2014 |
| WO | WO-2015178078 A1 | 11/2015 |
| WO | WO-2015192026 A1 | 12/2015 |
| WO | WO-2016054562 A1 | 4/2016 |
| WO | WO-2016065131 A1 | 4/2016 |
| WO | WO-2016/112299 A1 | 7/2016 |
| WO | WO-2016179166 A1 | 11/2016 |
| WO | WO-2016179235 A1 | 11/2016 |
| WO | WO-2017019379 A1 | 2/2017 |
| WO | WO-2017033141 A1 | 3/2017 |
| WO | WO-2017176739 A1 | 10/2017 |
| WO | WO-2017176992 A1 | 10/2017 |
| WO | WO-2018005644 A1 | 1/2018 |
| WO | WO-2019046790 A1 | 3/2019 |

OTHER PUBLICATIONS

"U.S. Appl. No. 15/967,201, Corrected Notice of Allowability mailed Mar. 6, 2019", 2 pgs.

"U.S. Appl. No. 15/967,201, Non Final Office Action mailed Jun. 15, 2018", 9 pgs.

"U.S. Appl. No. 15/967,201, Notice of Allowance mailed Nov. 29, 2018", 8 pgs.

"U.S. Appl. No. 15/967,210, Response filed Oct. 15, 2018 to Non Final Office Action mailed Jun. 15, 2018", 9 pgs.

"U.S. Appl. No. 16/296,153, Non Final Office Action mailed Sep. 29, 2020", 11 pgs.

"U.S. Appl. No. 16/296,153, Notice of Allowance mailed Mar. 1, 2021", 8 pgs.

"U.S. Appl. No. 16/296,153, Preliminary Amendment filed Jun. 19, 2019", 6 pgs.

"U.S. Appl. No. 16/296,153, Response filed Jan. 29, 2021 to Non Final Office Action mailed Sep. 29, 2020", 8 pgs.

"U.S. Appl. No. 17/354,356, Non Final Office Action mailed Sep. 14, 2022", 10 pgs.

"U.S. Appl. No. 17/354,356, Notice of Allowance mailed Jun. 12, 2023", 8 pgs.

"U.S. Appl. No. 17/354,356, Preliminary Amendment filed Sep. 2, 2021", 6 pgs.

"U.S. Appl. No. 17/354,356, Response filed Oct. 4, 2022 to Non Final Office Action mailed Sep. 14, 2022", 8 pgs.

"U.S. Appl. No. 17/354,356, Supplemental Notice of Allowability mailed Jun. 20, 2023", 5 pgs.

"U.S. Appl. No. 18/234,226, Notice of Allowance mailed Mar. 5, 2024", 9 pgs.

"Chinese Application Serial No. 201880055723.8, Notification to Make Rectification mailed Mar. 19, 2020", 2 pgs.

"Chinese Application Serial No. 201880055723.8, Notification to Make Rectification mailed Apr. 16, 2020", 2 pgs.

"Chinese Application Serial No. 201880055723.8, Office Action mailed Jul. 5, 2021", w/ English translation, 14 pgs.

"Chinese Application Serial No. 201880055723.8, Office Action mailed Nov. 3, 2020", w/ English Translation, 14 pgs.

"Chinese Application Serial No. 201880055723.8, Response filed Mar. 16, 2021 to Office Action mailed Nov. 3, 2020", 5 pgs.

"Chinese Application Serial No. 201880055723.8, Response filed Sep. 13, 2021 to Office Action mailed Jul. 5, 2021", w/ English Claims, 13 pgs.

"European Application Serial No. 18851821.1, Extended European Search Report mailed Jul. 24, 2020", 8 pgs.

(56) References Cited

OTHER PUBLICATIONS

"European Application Serial No. 22162265.7, Extended European Search Report mailed Jun. 20, 2022", 7 pgs.
"International Application Serial No. PCT/US2018/049213, International Preliminary Report on Patentability mailed Mar. 12, 2020", 7 pgs.
"International Application Serial No. PCT/US2018/049213, International Search Report mailed Dec. 26, 2018", 3 pgs.
"International Application Serial No. PCT/US2018/049213, Written Opinion mailed Dec. 26, 2018", 5 pgs.
"Korean Application Serial No. 10-2020-7009091, Notice of Preliminary Rejection mailed Apr. 24, 2021", w/ English translation, 12 pgs.
"Korean Application Serial No. 10-2020-7009091, Response filed Jul. 23, 2021 to Notice of Preliminary Rejection mailed Apr. 24, 2021", w/ English Claims, 22 pgs.
"Korean Application Serial No. 10-2021-7036156, Final Office Action mailed Apr. 1, 2022", w/ English translation, 6 pgs.
"Korean Application Serial No. 10-2021-7036156, Notice of Preliminary Rejection mailed Jan. 3, 2022", w/ English Translation, 11 pgs.
"Korean Application Serial No. 10-2021-7036156, Response filed Mar. 3, 2022 to Office Action Jan. 3, 2022", w/ English Claims, 18 pgs.
"Korean Application Serial No. 10-2022-7032180, Final Office Action mailed Mar. 2, 2023", W/English Translation, 7 pgs.
"Korean Application Serial No. 10-2022-7032180, Notice of Preliminary Rejection mailed Dec. 1, 2022", w/ English Translation, 12 pgs.
"Korean Application Serial No. 10-2022-7032180, Response filed Feb. 1, 2023 to Office Action mailed Dec. 1, 2022", w/ English Claims Translation, 15 pgs.
"Korean Application Serial No. 10-2021-7036156, Response filed May 31, 2022 to Office Action mailed Apr. 1, 2022", w/ English Claims, 21 pgs.
Castelluccia, Claude, et al., "EphPub: Toward robust Ephemeral Publishing", 19th IEEE International Conference on Network Protocols (ICNP), (Oct. 17, 2011), 18 pgs.
Fajman, "An Extensible Message Format for Message Disposition Notifications", Request for Comments: 2298, National Institutes of Health, (Mar. 1998), 28 pgs.
Langlotz, Tobias, et al., "Next-Generation Augmented Reality Browsers: Rich, Seamless, and Adaptive", Proceedings of the IEEE, 102(2), New York, US, (Feb. 1, 2014), 155-169.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.
Sawers, Paul, "Snapchat for iOS Lets You Send Photos to Friends and Set How long They're Visible for", [Online] Retrieved from the Internet: <URL: https://thenextweb.com/news/snapchat-for-ios-lets-you-send-photos-to-friends-and-set-how-long-theyre-visible-for>, (May 7, 2012), 5 pgs.
Shein, Esther, "Ephemeral Data", Communications of the ACM, vol. 56, No. 9, (Sep. 2013), 3 pgs.
Vaas, Lisa, "StealthText, Should You Choose to Accept It", [Online] Retrieved from the Internet: <URL: https://www.eweek.com/enterprise-apps/stealthtext-should-you-choose-to-accept-it/>, (Dec. 13, 2005), 3 pgs.
U.S. Appl. No. 15/692,990 U.S. Pat. No. 9,980,100, filed Aug. 31, 2017, Device Location Based on Machine Learning Classifications.
U.S. Appl. No. 15/967,201 U.S. Pat. No. 10,264,422, filed Apr. 30, 2018, Device Location Based on Machine Learning Classifications.
U.S. Appl. No. 16/296,153 U.S. Pat. No. 11,051,129, filed Mar. 7, 2019, Device Location Based on Machine Learning Classifications.
U.S. Appl. No. 17/354,356 U.S. Pat. No. 11,803,992, filed Jun. 22, 2021, Device Location Based on Machine Learning Classifications.
U.S. Appl. No. 18/234,226, filed Aug. 15, 2023, Device Location Based on Machine Learning Classifications.

\* cited by examiner

DEVICE LOCATION BASED ON MACHINE LEARNING CLASSIFICATIONS

CLAIM OF PRIORITY

This application is a continuation of and claims the benefit of priority of U.S. patent application Ser. No. 18/234,226, filed on Aug. 15, 2023, which is a continuation of and claims the benefit of priority of U.S. patent application Ser. No. 17/354,356, filed on Jun. 22, 2021, which is a continuation of and claims the benefit of priority of U.S. patent application Ser. No. 16/296,153, filed on Mar. 7, 2019, which is a continuation of and claims the benefit of priority of U.S. patent application Ser. No. 15/967,201, filed on Apr. 30, 2018, which is a continuation of and claims the benefit of priority of U.S. patent application Ser. No. 15/692,990, filed on Aug. 31, 2017, each of which is hereby incorporated by reference herein in its entirety.

TECHNICAL FIELD

Embodiments of the present disclosure relate generally to determining device locations and, more particularly, but not by way of limitation, to precise computer device location determinations based on machine learning classifications.

BACKGROUND

A computer (e.g., a smartphone) can approximate its location using geolocation services. For example, the computer can use global positioning system (GPS) data generated by an onboard GPS sensor to determine its location. However, often such information cannot pinpoint in which venue (e.g., café, restaurant, gas station) the computer is currently located if there are several venues near the computer.

BRIEF DESCRIPTION OF THE DRAWINGS

To easily identify the discussion of any particular element or act, the most significant digit or digits in a reference number refer to the figure ("FIG.") number in which that element or act is first introduced.

DETAILED DESCRIPTION

Figure 1:
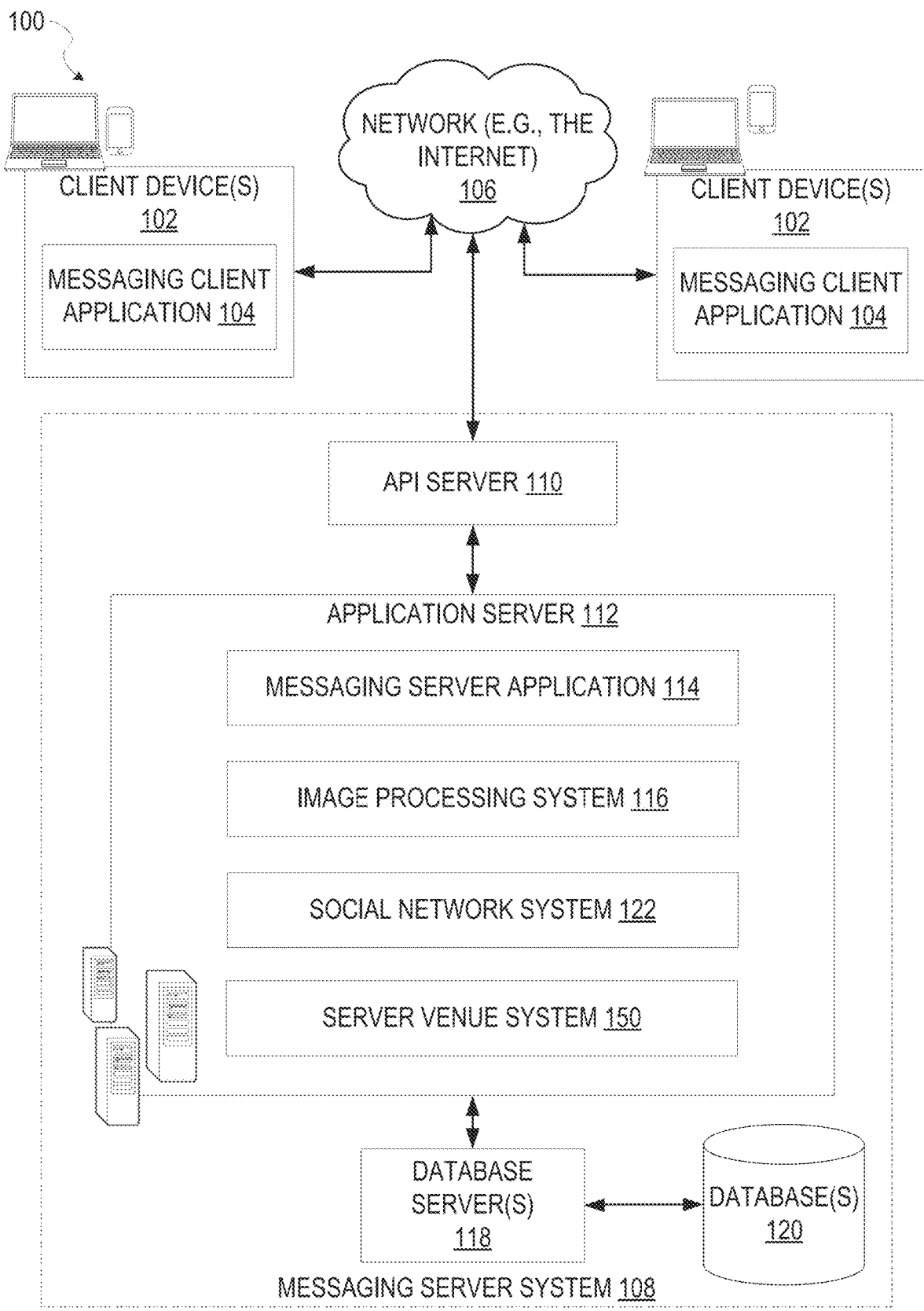
FIG. 1 is a block diagram showing an example messaging system for exchanging data (e.g., messages and associated content) over a network.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

A client device, such as a smartphone, can approximate its location using geolocation services. For example, a smartphone can use an onboard GPS sensor to determine the smartphones latitude and longitude. However, GPS accuracy can be limited by environmental factors, such as obstructing buildings and other objects that interfere with GPS signals. For example, due to physical obstructions (e.g., physical walls) a client device's GPS sensor may show the device at one restaurant when in fact the client device is located in another restaurant hundreds of feet away. Further, client device GPS accuracy can also be limited by protocol. For instance, while military grade GPS can be highly accurate, consumer-grade GPS often has distance resolution restrictions so the consumer-grade GPS devices are not used for malicious purposes. For these reasons, client device generated geolocation data may not accurately describe in which venue (e.g., café, restaurant, gas station) the client device is currently located.

To attempt to improve location determinations, the client device can send the GPS data to a server for further analysis. However, if the client device GPS signal is poor or if there are many venues nearby the data sent to the server may be inaccurate, in which case subsequent predictions generated by the server will also be inaccurate.

To this end, a venue system executing on a client device can leverage visual cues of the environment surrounding the client device to select a given venue from a set of possible venues. The visual cues may be identified using a machine learning scheme, such as one or more neural networks that have been trained for image processing (e.g., convolutional neural networks). Initially, the client device may collect its geolocation data and other information potentially helpful for location identification, e.g., a list of Internet Protocol (IP) networks that are visible to the client device. The client device can send the collected information to a location server for further analysis.

The server receives the request, accesses a venue database and returns the a number of venues that are nearest to the client device (e.g., nearest five venues). The venue database accessed by the server may contain location data (e.g., latitude/longitude data, address data, visible IP network data) for venues anywhere in the world. The server can use the geolocation data and other data (e.g., visible IP networks) to determine which venues in the database are closest to the client device.

According to some example embodiments, in response to receiving the set of venues from the server, the client device then attempts to filter out venues from the set of venues using visual cues from images of the surrounding environment. In particular, for example, the venue system implements one or more trained neural networks to analyze image data generated by the client device. For example, the venue system may use the trained neural networks to analyze images (e.g., an image, video, live video feed) captured by the user using his/her smartphone. This approach leverages the fact that the server has access to a potentially very large database of venues that is not storable on the client device and further leverages the client device's access to visual cues of the surrounding environment.

In some example embodiments, the venue system on the client device uses up to three machine learning schemes to determine visual information for venue selection. In those example embodiments, a first learning scheme is configured to determine whether the client device is in an outside environment or inside environment, a second machine learning scheme is configured to determine the type of venue directly, and a third machine learning scheme is configured to recognize objects (e.g., coffee mugs, slices of pizza, etc.) in a given venue. Further details of the engines are discussed below with reference to FIG. 6A.

An example can help illustrate how the machine learning scheme and accompanying logic are implemented, according to some example embodiments. Assume the client device is in a coffee shop and the user uses a smartphone to image the coffee shop, e.g., by taking a picture or video feed of the coffee shop. In response to imaging the coffee shop, the venue system automatically sends a location request to the server and receives four nearby venues as potential locations of the client device. Assume the four nearby venues include: an outdoor rooftop restaurant, headquarters of a social media technology company, an Italian restaurant, and a coffee shop.

The venue system then applies the machine learning schemes to the image to classify attributes about the image. In particular, for example, the first machine learning scheme determines that the image is of an inside environment, the second machine learning scheme determines that the image is most likely an Italian restaurant or a coffee shop, and the third machine learning scheme identifies a coffee mug in the image. Based on these determinations, the venue system excludes the outdoor restaurant because it is outside and the imaged environment has been determined to be inside by the first machine learning scheme. The second machine learning scheme determined that there is an equal likelihood that the image is of an Italian restaurant or of a coffee shop, and a low likelihood that the image is of an office setting (e.g., a technology company's headquarters), accordingly the headquarters is filtered or otherwise not selected. Finally, based on the third machine learning system identifying a coffee cup in the image, the venue system selects the coffee shop as the most likely venue for the client device's current location.

Each venue may be categorized in a data structure that includes categories and sub-categories, according to some example embodiments. The categories contain venue types at a higher level of granularity and the sub-categories refine a corresponding venue type. For example, a food category may have sub-categories including Mexican restaurant, fast food restaurant, Italian restaurant, coffee shop, and so on. Other categories and sub-categories may similarly be configured. Each specific venue can be generalized to a broader level which can more readily be tagged. For example, "Tony's Family Italian Restaurant—World's Best!" can be abstracted to the Italian restaurant venue type, which can be more readily be assigned tags and stored on the limited memory of a client device (e.g., a smartphone).

Each category and subcategory may have metadata tags that describe the category or subcategory. The metadata tags may include environmental conditions (e.g., "outside," "inside") as well as objects associated with a given type of venue (e.g., an Italian food restaurant sub-category may have tags including "pizza," "red and white checkered pattern," and "spaghetti"; while a coffee shop sub-category may have tags including "coffee mug," "coffee bean," and "Starbucks logo".)

The venue system can use the classifications generated by the machine learning schemes to select matching venues. Referring to the above example, the venue system filtered out venues having "outdoor" tags because the image was determined to be of an inside environment. Further, the second machine learning scheme a low likelihood that that the image is of an office, and returned equal numerical likelihoods for Italian restaurant and coffee shop; accordingly, the venue system can filter out or otherwise not select the technology company headquarters venue. The third machine learning scheme successfully identified a coffee mug in the image, and coffee mug is a metadata tag of the coffee shop category, thus the coffee shop is selected as the current venue of the client device. Other examples are discussed below with reference to the figures.

Once the venue is selected, the venue system or other applications on the client device can use the selected venue to create location based user interface (UI) content. Continuing the example, once the coffee shop is determined, a cartoon avatar (e.g., bitmoji) of the user operating the client device can be overlaid on the image of the coffee shop. The image with the overlaid content can the be posted to a social media network, e.g., as an ephemeral message, discussed in further detail below. Other examples of UI content include banners, captions (e.g., a caption outside the border of the image denoting where the image was taken), or augmented reality content, and so on. The UI content can be categorized using the same data structure of categories and sub-categories used to structure the venue types. In this way, when a venue of a given category (or sub-category) is selected, the UI content for overlay can be readily retrieved.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108, and to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client devices 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to a messaging server application 114 for possible access by another messaging client application 104; the setting of a collection of media data (e.g., a story); the retrieval of such collections; the retrieval of a list of friends of a user of a client device 102; the retrieval of messages and content; the adding and deletion of friends to and from a social graph; the location of friends within the social graph; and opening application events (e.g., relating to the messaging client application 104).

The application server 112 hosts a number of applications and subsystems, including the messaging server application 114, an image processing system 116, a social network system 122, and a server venue system 150. The messaging server application 114 implements a number of message-processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes the image processing system 116, which is dedicated to performing various image processing operations, typically with respect to images or video received within the payload of a message at the messaging server application 114.

The social network system 122 supports various social networking functions and services, and makes these functions and services available to the messaging server application 114. To this end, the social network system 122 maintains and accesses an entity graph (e.g., entity graph 304 in FIG. 3) within the database 120. Examples of functions and services supported by the social network system 122 include the identification of other users of the messaging system 100 with whom a particular user has relationships or whom the particular user is "following," and also the identification of other entities and interests of a particular user.

The sever venue system 150 is configured to receive, from a client device 104, a request for venues near the location of the client device 102. Further details of the server venue system 150 are discussed below with reference to FIG. 6B.

The application server 112 is communicatively coupled to a database server 118, which facilitates access to a database 120 in which is stored data associated with messages processed by the messaging server application 114.

Figure 2:
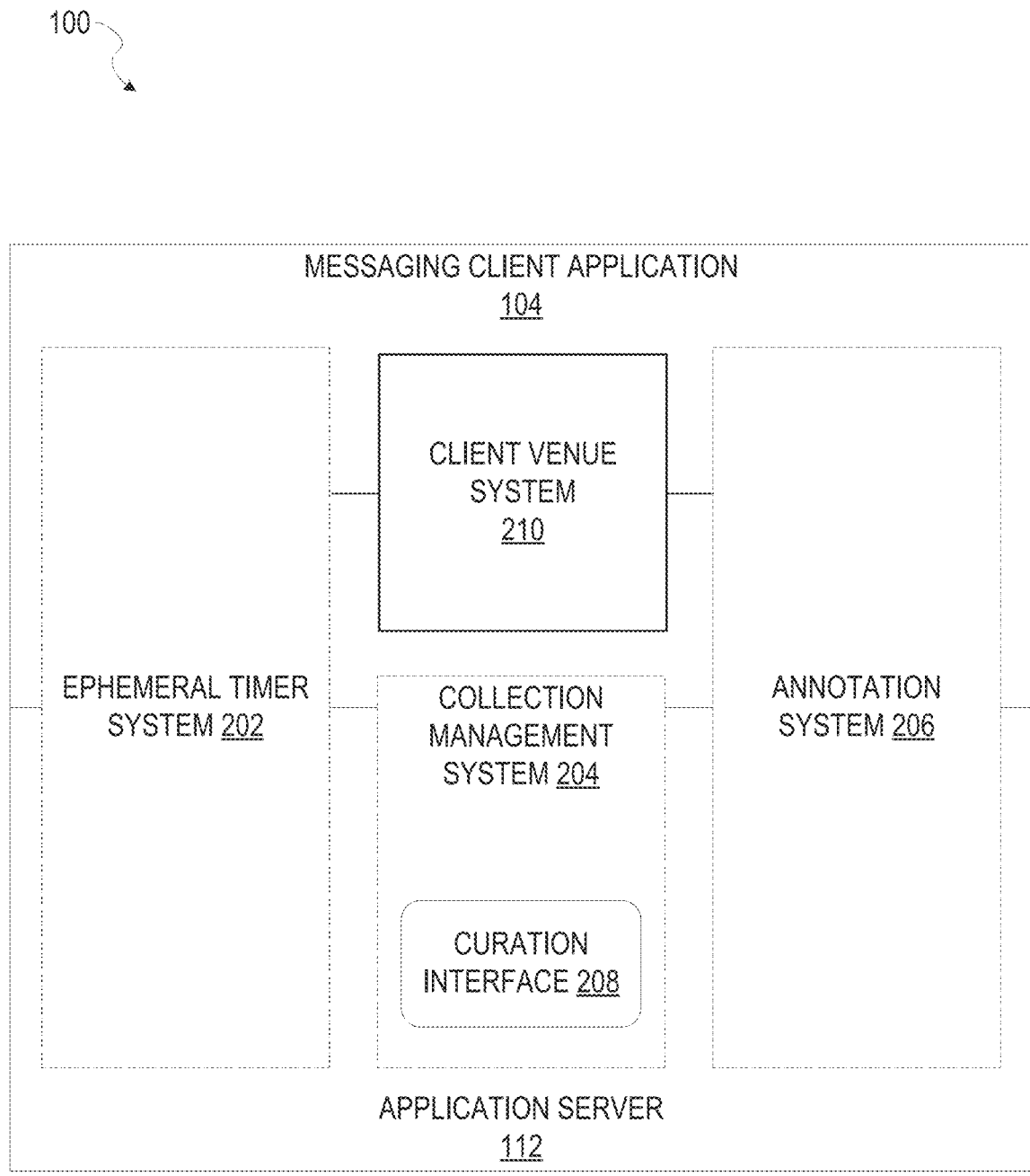
FIG. 2 is block diagram illustrating further details regarding a messaging system having an integrated virtual object machine learning system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of subsystems, namely an ephemeral timer system 202, a collection management system 204, an annotation system 206, and a client venue system 210.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message or collection of messages (e.g., a SNAPCHAT Story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT Geofilter or filter) to the messaging client application 104 based on a geolocation of the client device 102. In another example, the annotation system 206 operatively supplies a media overlay to the messaging client application 104 based on other information, such as social network information of the user of the client device 102 or a venue selected by the client venue system 210. A media overlay may include audio and visual content and visual effects. Examples of audio and visual content include pictures, text, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map and upload content associated with the selected geolocation. The user may also specify circumstances under which particular content should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

Figure 3:
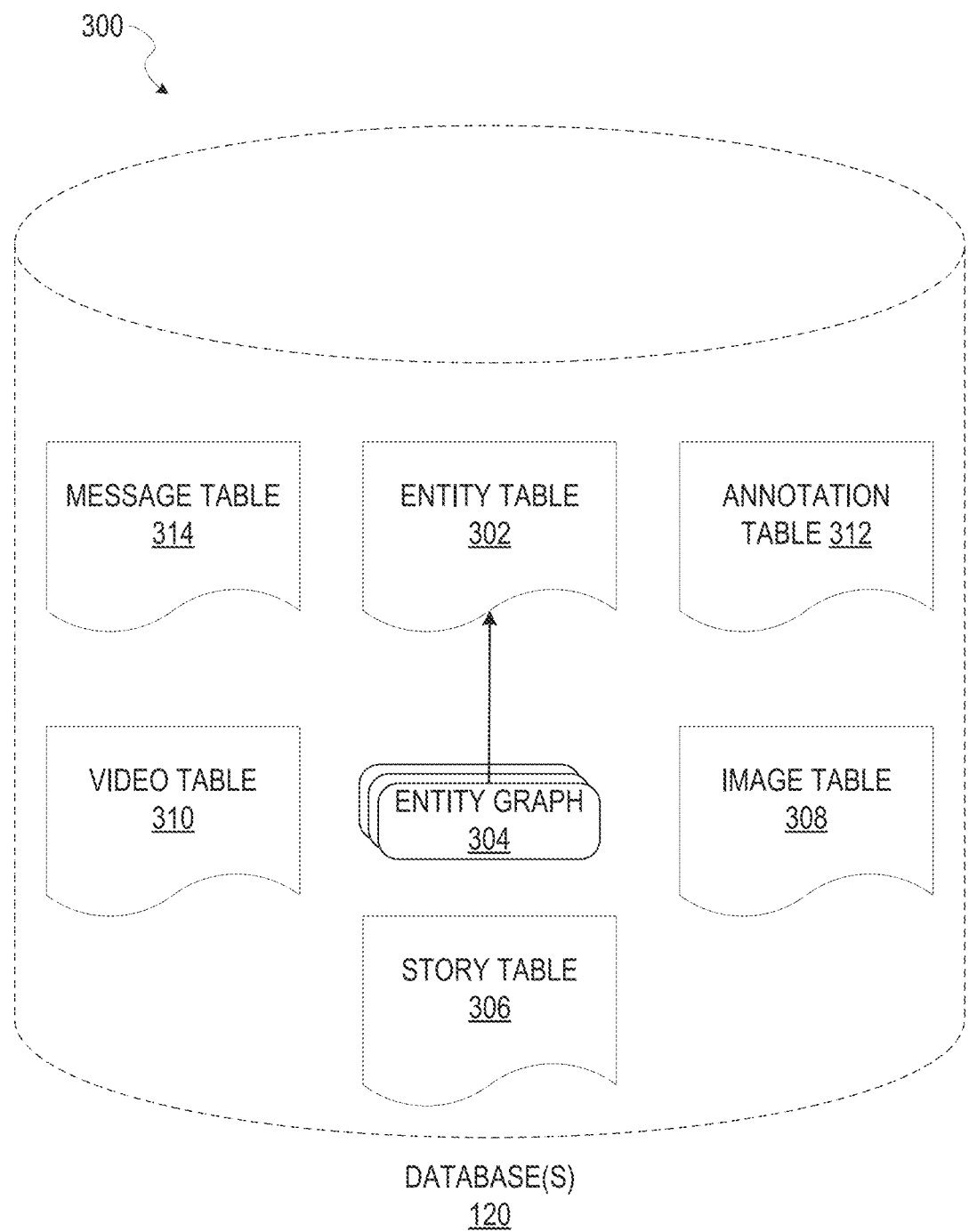
FIG. 3 is a schematic diagram illustrating data which may be stored in a database of a messaging server system, according to certain example embodiments.

FIG. 3 is a schematic diagram illustrating data 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interest-based, or activity-based, for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314.

Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a SNAPCHAT Story or a gallery). The creation of a particular collection may be initiated by a particular user (e.g., each user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location or event at a particular time may, for example, be presented with an option, via a user interface of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
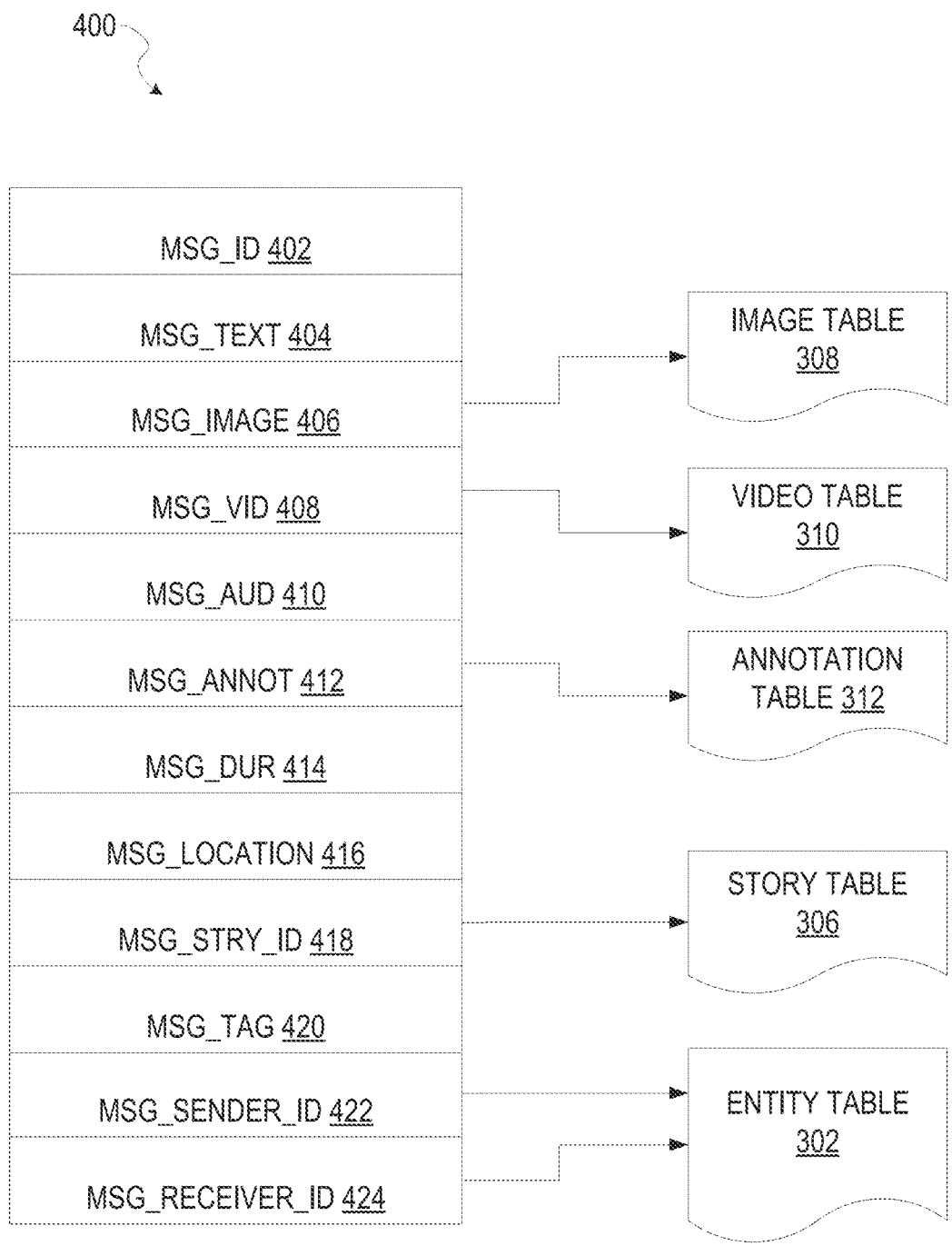
FIG. 4 is a schematic diagram illustrating a structure of a message, according to some embodiments, generated by a messaging client application for communication.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data captured by a camera component of a client device 102 or retrieved from memory of a client device 102, and that is included in the message 400.

A message video payload 408: video data captured by a camera component or retrieved from a memory component of the client device 102, and that is included in the message 400.

A message audio payload 410: audio data captured by a microphone or retrieved from the memory component of the client device 102, and that is included in the message 400.

Message annotations 412: annotation data (e.g., filters, stickers, or other enhancements) that represents annotations to be applied to the message image payload 406, message video payload 408, or message audio payload 410 of the message 400.

A message duration parameter 414: a parameter value indicating, in seconds, the amount of time for which content of the message 400 (e.g., the message image payload 406, message video payload 408, and message audio payload 410) is to be presented or made accessible to a user via the messaging client application 104.

A message geolocation parameter 416: geolocation data (e.g., latitudinal and longitudinal coordinates) associated with the content payload of the message 400. Multiple message geolocation parameter 416 values may be included in the payload, with each of these parameter values being associated with respective content items included in the content (e.g., a specific image in the message image payload 406, or a specific video in the message video payload 408).

A message story identifier 418: identifies values identifying one or more content collections (e.g., "stories") with which a particular content item in the message image payload 406 of the message 400 is associated. For example, multiple images within the message image payload 406 may each be associated with multiple content collections using identifier values.

A message tag 420: one or more tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address, or device identifier) indicative of a user of the client device 102 to which the message 400 is addressed.

The contents (e.g., values) of the various components of the message 400 may be pointers to locations in tables within which content data values are stored. For example, an image value in the message image payload 406 may be a pointer to (or address of) a location within the image table 308. Similarly, values within the message video payload 408 may point to data stored within the video table 310, values stored within the message annotations 412 may point to data stored in the annotation table 312, values stored within the message story identifier 418 may point to data stored in the story table 306, and values stored within the message sender identifier 422 and the message receiver identifier 424 may point to user records stored within the entity table 302.

Figure 5:
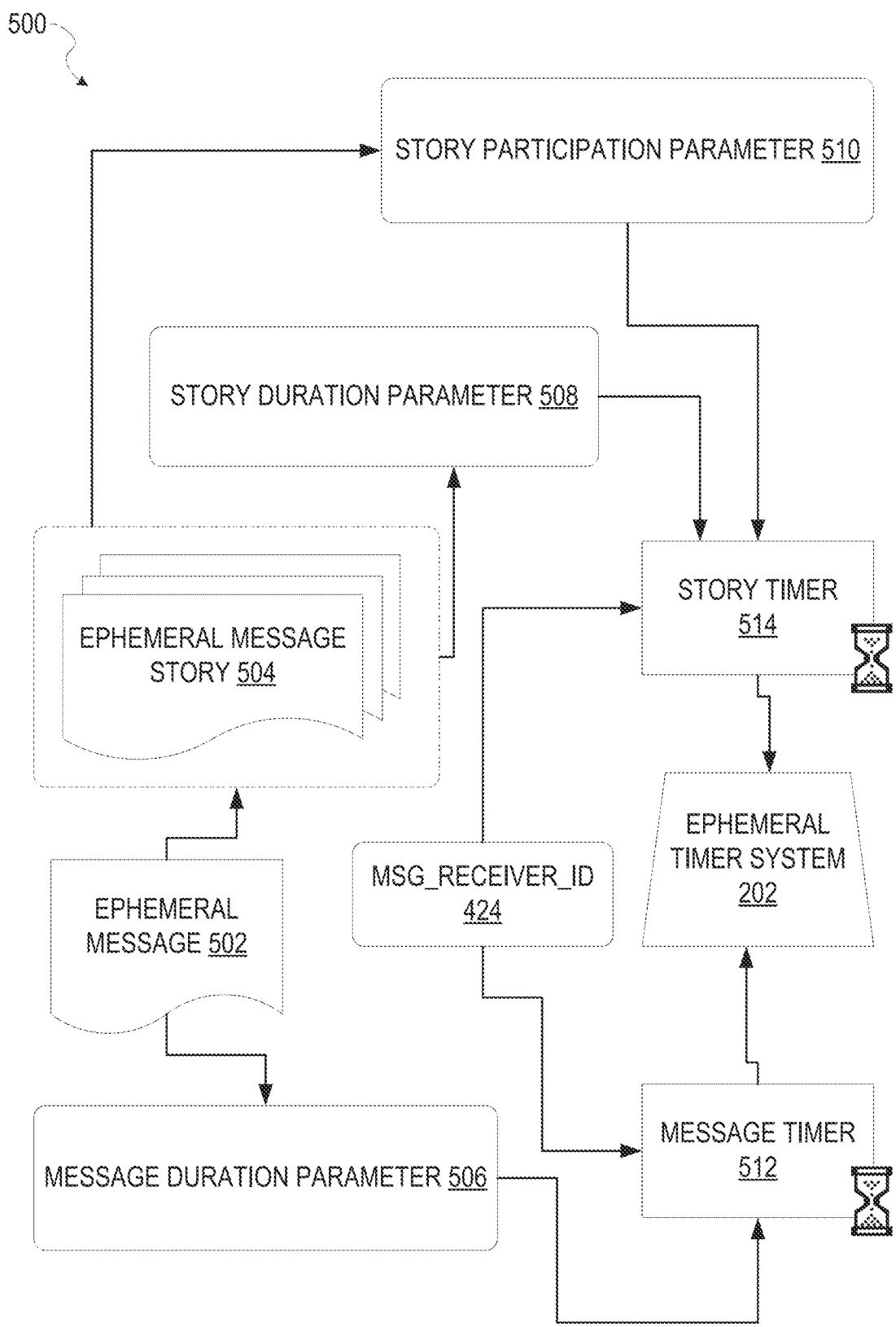
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral).

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is a SNAPCHAT application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal SNAPCHAT Story, or an event story). The ephemeral message story 504 has an associated story duration parameter 508, a value of which determines a time duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message 502 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time period specified by the story duration parameter 508. In a further embodiment, a certain ephemeral message 502 may expire, within the context of the ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

In response to the ephemeral timer system 202 determining that an ephemeral message story 504 has expired (e.g., is no longer accessible), the ephemeral timer system 202 communicates with the messaging system 100 (e.g., specifically, the messaging client application 104) to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6A:
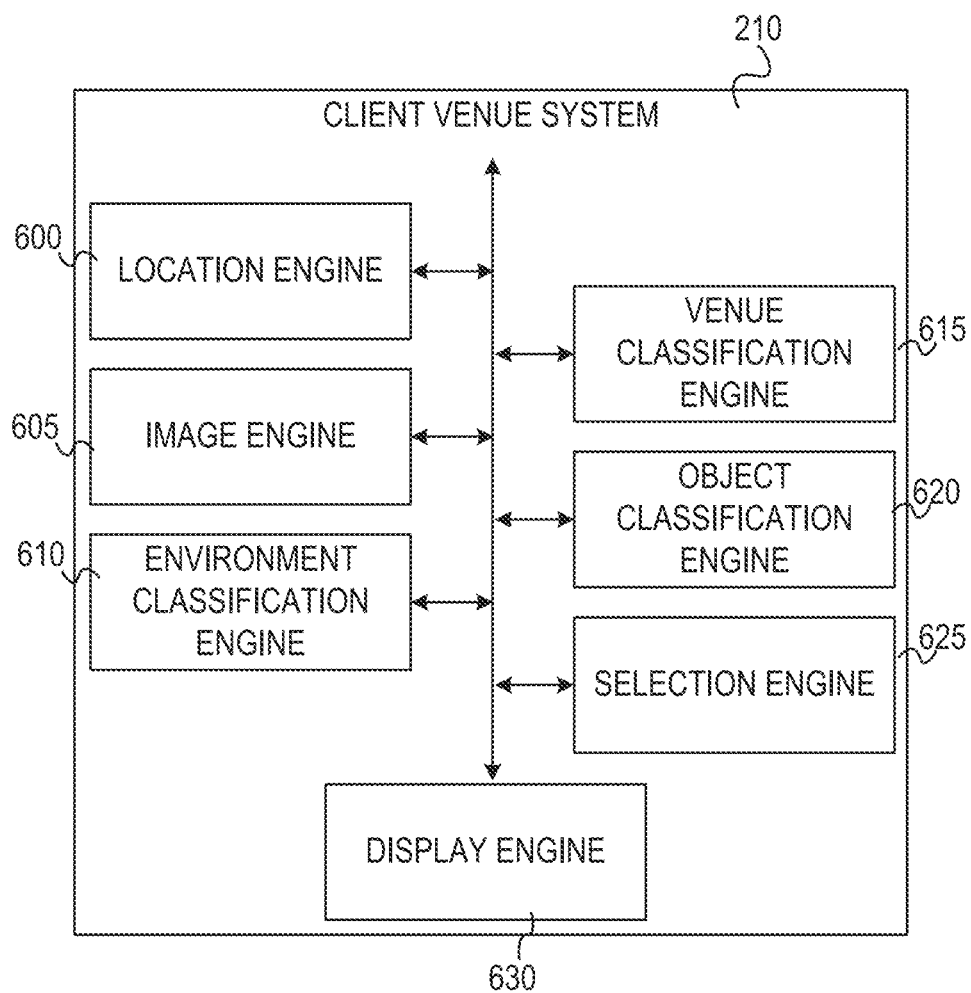
FIG. 6A shows example components of a client venue system, according to some example embodiments.

FIG. 6A shows example internal functional components of a client venue system 210, according to some example embodiments. As illustrated, the client venue system 210 comprises a location engine 600, an image engine 605, an environment classification engine 610, a venue classification engine 615, an object classification engine 620, a selection engine 625, and a display engine 630. The location engine 600 is configured to transmit a location request to a location server, according to some example embodiments. For example, the request may contain latitude and longitude information generated from an onboard GPS sensor of a client device, e.g., client device 102. The location server (see FIG. 6B) can use the latitude and longitude information to determine which venues are nearest to the client device and send the nearest venues (e.g., up to the nearest five venues) to the client device. In some example embodiments, the request further includes IP networks that are visible to the client device. In those example embodiments, the location server can use the name or type of visible IP networks to further ascertain which venues are nearest to the client device.

The image engine 605 manages identifying one or more images using an image sensor of the client device 102. In some example embodiments, the image engine 605 identifies images already generated by the messaging client application 104 (and stored in image table 308) and imports them into the client venue system 210 for further processing. In some example embodiments, the image engine 605 interfaces with an image sensor of the client device 102 to generate one or more images. Further, in any of the example embodiments, the images identified by the image engine 605 may be part of a live video feed which is being dynamically displayed on a screen of the client device 102 as the video is recorded.

The environment classification engine 610 is configured to receive the images identified by the image engine 605 and classify each image as being an image of an outdoor environment or an image of an indoor environment. The classification generated by the environment classification engine 610 may be stored as metadata of each classified image (e.g., as metadata of the image file, or separate data that references an image file). In some example embodiments, the environment classification engine 610 is implemented as a machine learning scheme, such as a convolutional neural network. The convolutional neural network in environment classification engine 610 can be trained on a training set of images of outdoor and indoor environments. Examples of outdoor environments imaged in the training set include parks, streets, airplane interiors, amphitheaters, and so on. Examples of indoor environments imaged in the training set includes bowling alleys, bedrooms, kitchens, classrooms, ballrooms, offices, theaters, and so on. In some example embodiments, the classifications output by the environment classification engine 610 are output as numerical likelihood that a given image is of a particular environment, as is appreciated by those of ordinary skill in the art (e.g., an image of a park may yield the following classification likelihoods: outside=0.93, inside=0.20, where the decimals corresponding percentages).

The venue classification engine 615 is configured to receive the images identified by the image engine 605 and classify each image as a type of venue. The classification generated by the venue classification engine 615 may be stored as metadata of each classified image file or as separate data that references the image file. In some example embodiments, the venue classification engine 615 is implemented as a machine learning scheme, such as a convolutional neural network. The convolutional neural network in the venue classification engine 615 can be trained on the training set of images of different types of venues or places. In contrast with the environment classification engine 610 (which outputs likelihoods of indoor and outdoor environments), the venue classification engine 615 is configured to output likelihoods that a given image is an image of known specific places (e.g., bar, Italian restaurant, park, beach). The convolutional neural network in the venue classification engine 615 can be trained on a training set of images including images of the different places, e.g., an image of a bar, an image of a beach, an image of a casino, an image of a mountain range. In some example embodiments, the classifications output by the venue classification engine 615 are output as a numerical likelihood that a given image is of a particular venue, as is appreciated by those of ordinary skill in the art (e.g., an image of a beach may yield the following classification likelihoods: beach=0.83, yard=0.75, bar=0.34, Italian restaurant=0.30).

The object classification engine 620 is configured to classify physical objects depicted in the images. The classification generated by the object classification engine 620 may be stored as metadata of each classified image file or as separate data that references a corresponding image file. In some example embodiments, the object classification engine 620 is implemented as a machine learning scheme, such as a convolutional neural network. The convolutional neural network in the object classification engine 620 can be trained on the training set of images of different types of physical objects, such as coffee mugs, wine glasses, pizza, Christmas trees, swimming pools, vehicles, animals, and so on. In some example embodiments, the classifications output by the object classification engine 620 are output as numerical likelihood that a given image feature in an image is of a particular object, as is appreciated by those of ordinary skill in the art (e.g., a wine glass image feature within a bounded region of interest (ROI) in a given image may have the following classification likelihoods: wine glass=0.93, frog=0.05, basketball=0.30, coffee mug=0.60).

The selection engine 625 manages selecting a venue from a venue data set (e.g. a venue data set returned from an application server) using the classification data generated by the other engines, according to some example embodiments. Further, the selection engine 625 may further be configured to select one or more UI display elements based on the type of venue selected. For example, if the selection engine 625 determines that the client device 102 is in a bar (e.g., a bar sub-category), the selection engine 625 automatically selects a cartoon avatar and optional lens data for overlay on the one or more images.

The display engine 630 is configured to generate a presentation of the one or more images (e.g. an image, a live video feed) with the selected display elements. Continuing the example above, the display engine 630 may display a cartoon avatar of a person with a martini over a live image feed of the bar. A portion of a live image feed (e.g. an image, a video sequence) with the overlaid display elements may be stored or otherwise published on a social network as an ephemeral message 502 (e.g., via the annotation system 206), according to some example embodiments.

Figure 6B:
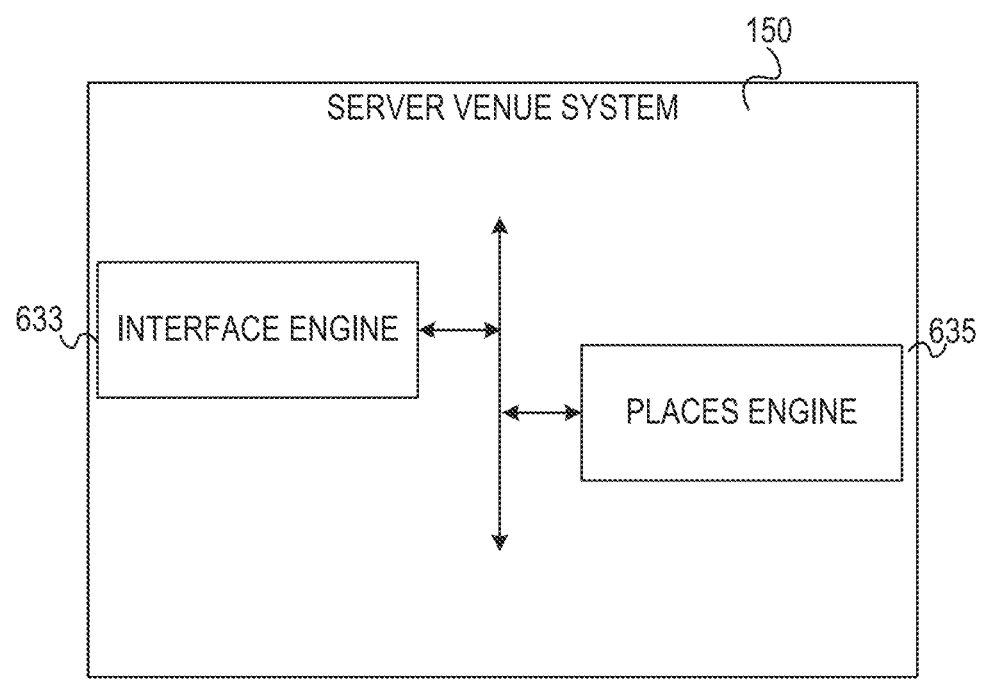
FIG. 6B shows example components of a server venue system, according to some example embodiments.

FIG. 6B shows example functional components of a server venue system 150, according to some example embodiments. As illustrated, the server venue system 150 comprises an interface engine 633 and a places engine 685. The interface engine 633 is configured to receive requests, such as a venue request, from the client device 102. The places engine 635 is configured to use the information sent in a venue request to determine the venues that are nearest to the client device 102. The places engine 635 is further configured to send the set of the nearest venues to the client device 102 as a response to the location request. In some example embodiments, the set of venues returned to the client device 102 are the five venues that are nearest to the client device 102.

Further, in some example embodiments, one or more of the engines of the client venue system 210 are integrated into the server venue system 150 as fallbacks. For example, instances of the environment classification engine 610, a venue classification engine 615, an object classification engine 620, a selection engine 625 can be executed from the application server 112 if the client device 102 does not have enough computational power (e.g., processing speed, memory space) to perform classifications and/or selections.

In those embodiments, the client device 102 sends image data and location data to the server venue system 150 for processing. The server venue system performs classifications (e.g., the operations of FIG. 7 and below) and sends data back to the client device for further operations (e.g., display of overlay data based upon the venue identified).

Figure 7:
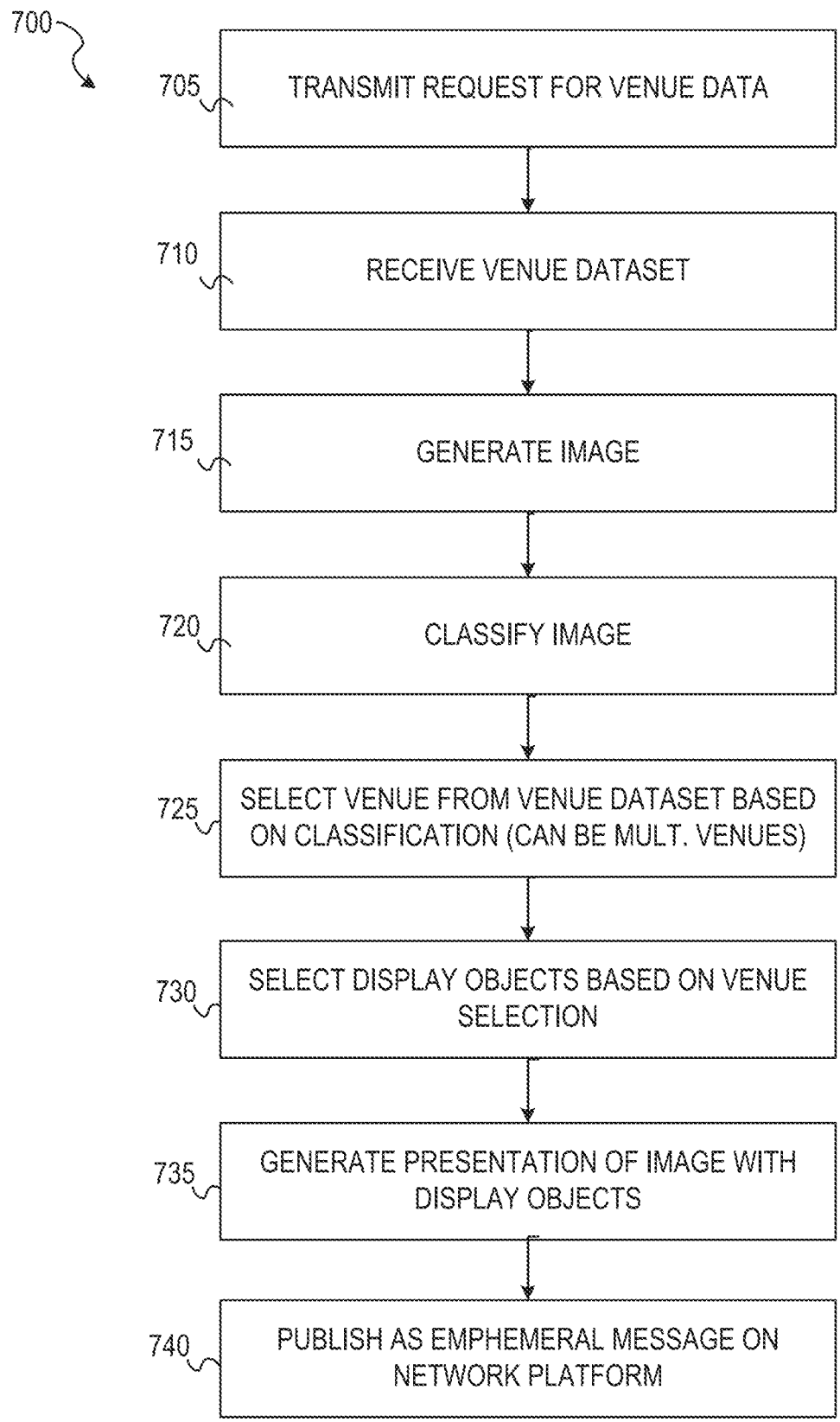
FIG. 7 shows a flow diagram of a method for implementing improved venue selection using machine learning classifications, according to some example embodiments.

FIG. 7 shows a flow diagram of a method 700 for implementing improved venue selection using machine learning classifications, according to some example embodiments. At operation 705, the location engine 600 transmits a communication to a server (e.g., application server 112) that requests a set of the venues nearest to the client device. The request may include GPS data generated by the client device and other information used to identify nearby venues (e.g., visible IP networks).

At operation 710, the location engine 600 receives a venue data set from the server. For example, the location engine may receive the five venues that are nearest to the client device 102. At operation 715, the image engine 605 generates one or more images using the client device 102. For example, the image engine 605 uses an image sensor on the client device 102 to generate an image or video (e.g., multiple images in sequence). In some example embodiments, the client device 102 displays a live video feed on the screen of the client device 102, and one or more images of operation 715 are sampled from the live video stream.

In some example embodiments, operation 715 occurs before operation 705; that is, the image is generated before the venue request is transmitted. For example, the user may generate an image, and responsive to the image being generated, the client venue system 210 transmits the request of operation 705 to determine where the client device 102 is at the approximate time the image was taken.

At operation 720, the client venue system 210 classifies the one or more images based on what the images depict. For example, if the image generated at operation 715 is of a coffee mug in a coffee shop, then at operation 720, the client venue system 210 may using a machine learning scheme to identify that the image is of an indoor environment comprising a coffee mug. In some example embodiments, the client venue system 210 implements the machine learning scheme as one or more neural networks. Further details of classification of operations 720 as discussed in detail below with reference to FIG. 8.

At operation 725, the selection engine 625 selects a venue from the venue data set based on the classification data generated at operation 720. For example, the selection engine 625 may determine that based on the classification data (e.g., an indoor environment, a depicted coffee mug), the coffee shop is the most likely type of venue and thus selects the coffee shop venue type.

At operation 730, the selection engine 625 selects one or more display objects based on the venue selected. The content selected may be pre-associated in a data structure with the venue categories and sub-categories. At operation 735, the display engine 630 generates a presentation of the image with the selected display objects, according to some example embodiments.

In some example embodiments, the selection engine 625 passes information about which display objects were selected to the annotation system 206, which can then use the information to generate an ephemeral message 502. At operation 740, the annotation system 206 publishes the presentation to a social network platform as an ephemeral message 502, according to some example embodiments.

Figure 8:
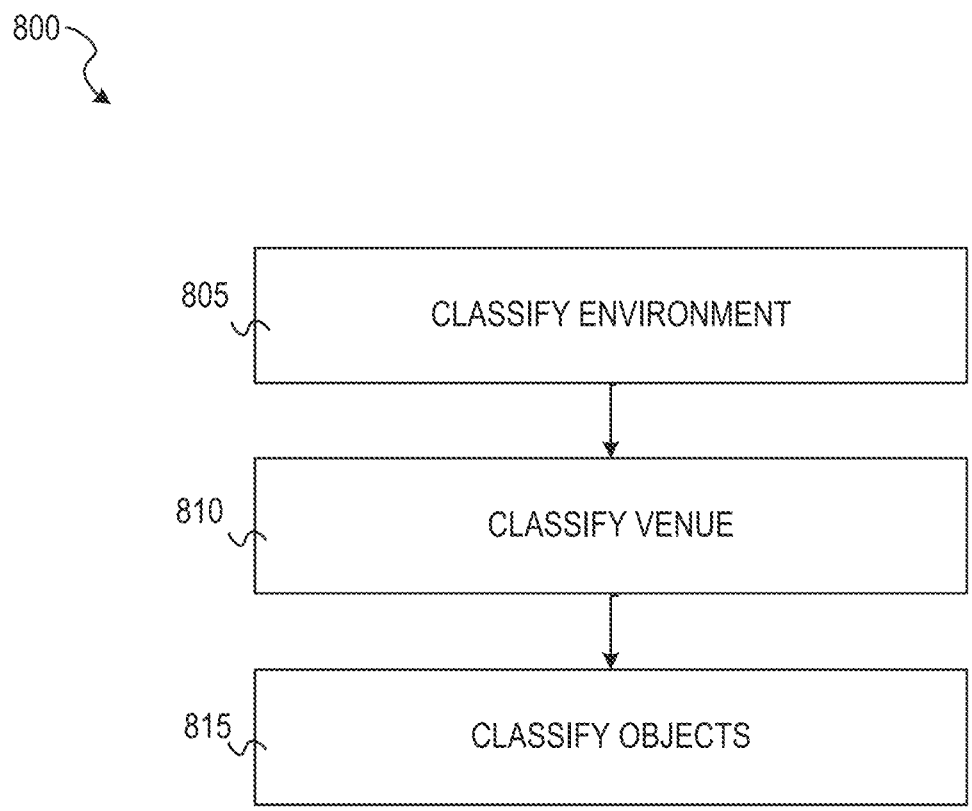
FIG. 8 shows a flow diagram of a method of generating classifications for images, according to some example embodiments.

FIG. 8 shows a flow diagram of a method 800 of generating classifications for images, according to some example embodiments. The operations 805-815 of the method 800 may be performed as a subroutine of operation 720 in FIG. 7, according to some example embodiments. At operation 805, the environment classification engine 610 receives an image an input and generates a numerical likelihood that the image of an outside environment and a numerical likelihood that the image is of an inside environment. At operation 810, the venue classification engine 615 receives the image as input and generates numerical likelihoods that the image is of different possible venues. The numerical likelihoods output may depend on how many venues the venue classification engine 615 has been trained on. For example, if the convolutional neural network is trained on images of ten different venues, then at operation 810, the venue classification engine 615 generates ten different numerical likelihoods for a given image.

At operation 815, the object classification engine 620 generates numerical likelihoods that object depicted in a given image is a known type of object. For example, the object classification engine 620 may first apply a image feature detection scheme (e.g., Sobel edge detection, blob detection, etc.) to find different regions of interest (ROI) within a given image. Each ROI is a polygon that encircles a given image feature. The image data of each ROI may then be input into the object classification engine 620 for classification. The object classification engine 620 may, for each ROI, generate a plurality of likelihoods that the ROI comprises a given type of object. For example, if the object classification engine 620 is trained on images of five different objects, at operation 815, the object classification engine 620 generates five different numerical likelihoods for each ROI.

Figure 9:
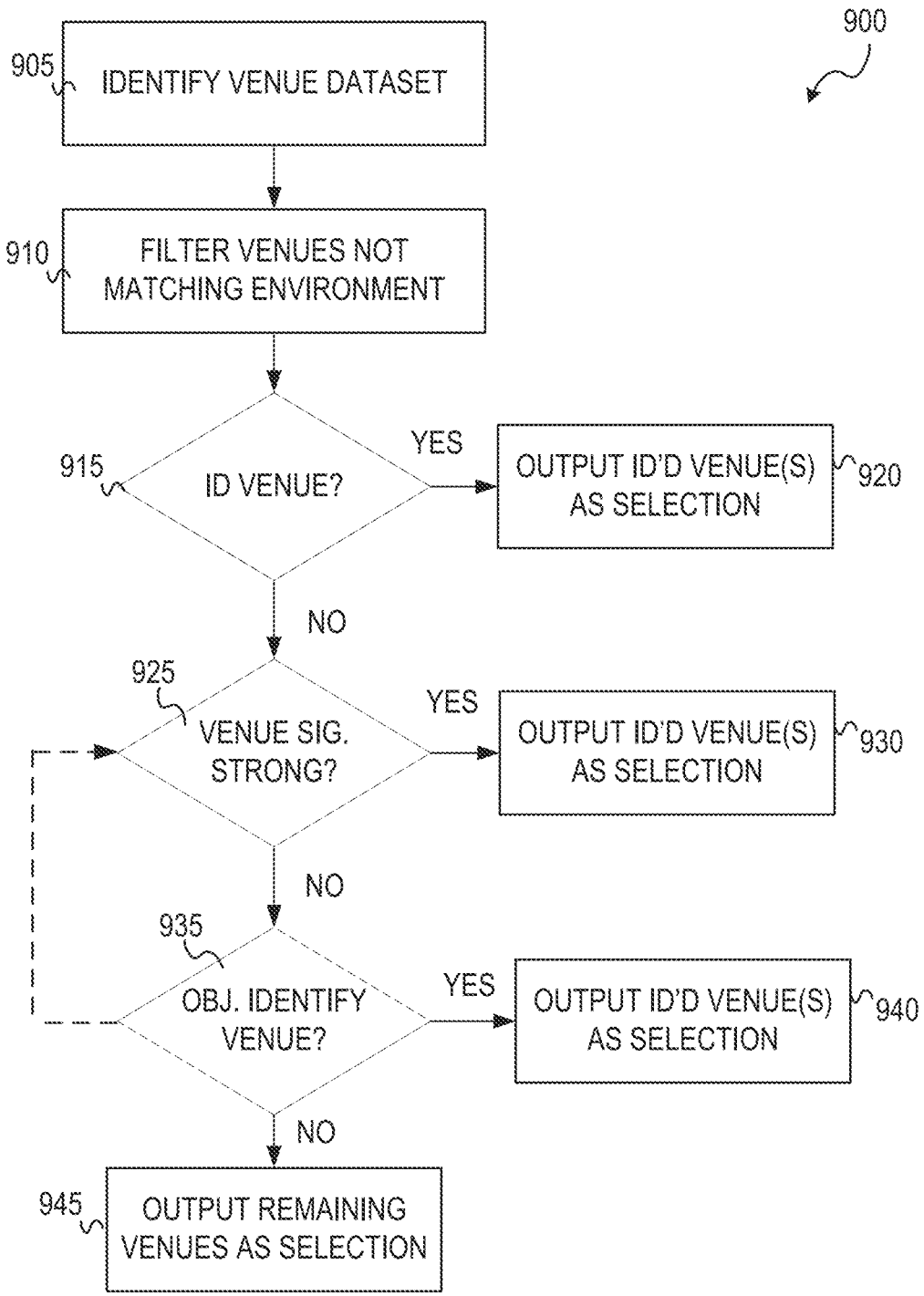
FIG. 9 shows a flow diagram of a method for selecting one or more venues from a venue dataset, according to some example embodiments.

FIG. 9 shows a flow diagram of a method 900 for selecting one or more venues from a venue dataset, according to some example embodiments. At operation 905, the selection engine 625 identifies a set of potential venues (e.g., the venue dataset returned from the application server 112). At operation 910, the selection engine 625 filters out venues in the set of potential venues that do not match the environment classification data generated at operation 805 of FIG. 8. For example, if the environment classification data indicates that a given image is of an outside environment, potential venues that are indoor environments are filtered at operation 910. Venues that have both an outdoor and indoor metadata tag (e.g., a Las Vegas casino modeled after ancient Greece that has a famous indoor casino area and also a famous outdoor pool area) may be not filtered out at operation 910 because a user could be in the outside area or inside area of the venue. At operation 910, the selection engine 625 determines whether the filtering processes of operating 910 has sufficiently narrowed the number of venues. For example, if there are five venues and four are filtered out at operation 910, then then the remaining venue is output as a selection by the selection engine 625 at operation 910. In some embodiments, if a pre-set number of venues are remaining at operation 915, then the remaining venues are output at 920 as selections. The remaining venues (and associated overlay content) can be presented to the user as options and the user can select the correct venue. In some example embodiments, when the selection engine 625 presents different venue options to users, the selection engine 625 records which venue is most often selected by users. Then, when multiple venue options are presented to the user the most often user selected venue is placed at the top of the options list.

Assuming there are still venues (e.g., more than one venue in the set), the method 900 continues to operation 905. At operation 905, the selection engine 625 determines whether any of the remaining venues have venue classifications generated at operating 810 exceed a pre-specified threshold. If one or more of the remaining venue's venue classification exceeds the pre-specified threshold, the one or more venues are output at operating 930 as selections. For example, if a threshold is set at 0.90, and an Italian restaurant receives numerical likelihood of 0.45 and a coffee shop receives a numerical likelihood of 0.95, the coffee shop is selected at operation 930.

Further, in some example embodiments, objects recognized by another engine may push a venue's numerical likelihood over the threshold. Each recognized object can have a set weight or value that affects the numerical likelihood of a corresponding venue. For example, assume the threshold is set to 0.90 and the Italian restaurant receives numerical likelihood of 0.70 and a coffee shop receives a numerical likelihood of 0.80, thus both are under the threshold and not selected. However, assume later a coffee cup is detected by the object classification engine 620. The recognition of the coffee cup can add 0.2 to the numerical likelihood of the coffee shop thereby pushing the coffee shop over the threshold and causing the coffee shop to be selected by the selection engine 625.

Assuming at operation 925, none of the venue classifications are strong signals (e.g., signals that exceed the threshold), then the method 900 continues to operation 935. At operation 935, the selection engine 625 determines whether any of the detected objects identified at operation 815 match tags of the remaining venues. If the objects to match a tag, the venues are output at operation 940 as selections. For example, if a coffee mug is detected and the coffee mug is a tag to a food category and a coffee shop sub-category, then any venues in the set that match food or coffee shop are selected at operation 940. On the other hand, if no recognizable objects were detected in the image, or if the detected objects to not match the remaining venues, then the remaining venues are output as selections at 945. For example, if three venues remain, the three venues can be displayed as options to the user and the user can select the correct venue.

Further, as denoted by the dotted arrow extending from operation 935 to 925, the objects analyzed at operation 935 may trigger a readjustment of the venue numerical likelihood (e.g., a recognized object pushes a venue over a threshold).

In some example embodiments, operation 925 is skipped. For example, after operation 915 the process continues directly to operation 935 for object based selection. In these embodiments, the client venue system is filtering out non-matching environments, then using objects to determine the correct venue.

Further, in some example embodiments, the selected venues can be further modified to indicate whether they are of the outside portion of the venue, or inside portion of the venue. For example, instead of selecting "casino" as a venue, "casino-outside" is selected. The UI content displayed with the image of the venue can depend on the venue and also whether the user is inside or outside the venue.

Figure 10:
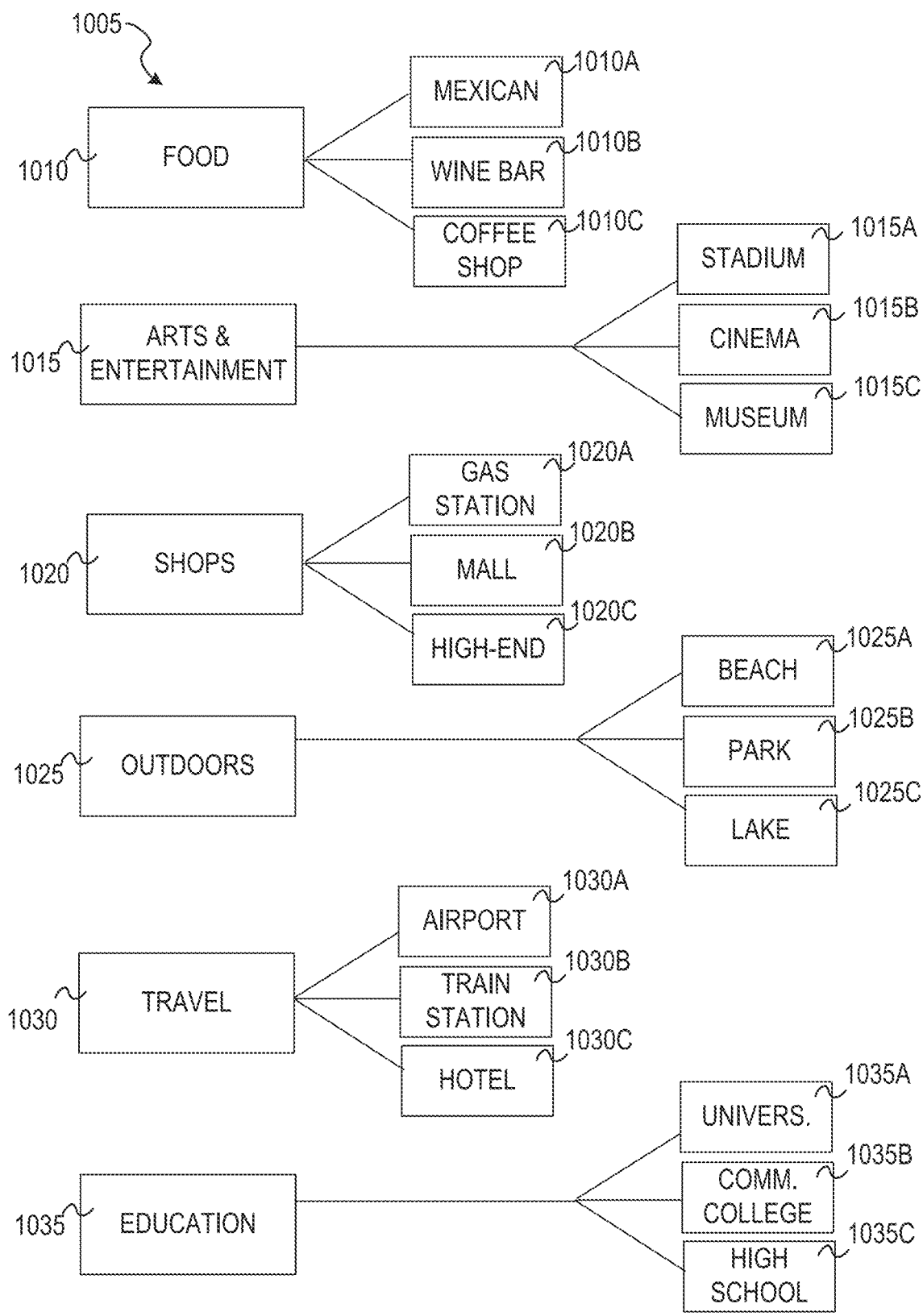
FIG. 10 shows a data structure that can be used to filter or otherwise select venues and display content, according to some example embodiments.

FIG. 10 shows a data structure 1005 that can be used to filter or otherwise select venues and display content, according to some example embodiments. In some example embodiments, the data is stored in a relational database, graph database, and other forms of structured data. The example data structure 1005 comprises categories including a food category 1010, an arts and entertainment category 1015, a shops category 1020, an outdoors category 1025, a travel category 1030, and an education category 1035. Each of the categories may be associated or otherwise linked to subcategories that further refine a given category. For example, the food category 1010 is subdivided into subcategories including a Mexican restaurant food subcategory 1010A, a wine bar subcategory 1010B, and a coffee shop subcategory 1010C. Further, the arts and entertainment category 1015 is subdivided into subcategories including a stadium subcategory 1015A, a cinema subcategory 1015B, and a museum subcategory 1015C. Further, the shops category is further subdivided into subcategories including a gas station subcategory 1020 A, a mall category 1020B, and a high-end shop category 1020C. Further, the outdoors category 1025 is subdivided into subcategories including a beach subcategory 1025A, a park subcategory 1025B, and a lake category 1025C. Further, the travel category 1030 is further subdivided into an airport category 1030A, a train station category 1030B, and a hotel category 1030C. Further, the education category 1035 is subdivided into subcategories including a university subcategory 1035A, a community college subcategory 1035B, and the high school subcategory 1035C. Although a limited number of categories and subcategories are depicted in the example of FIG. 10, it is appreciated by those of ordinary skill in the art that the number of categories and corresponding subcategories can be expanded to include additional categories and subcategories as needed.

Each of the venues returned as part of the venue dataset is pre-categorized into at least one of the categories or subcategories of the data structure. Each of the categories and sub-categories can be associated with metadata tags that can be used to filter or select categories based on machine learning generated classifications. The data structure and tags can be stored on the local memory of a client device, e.g., client device 102.

Figure 11:
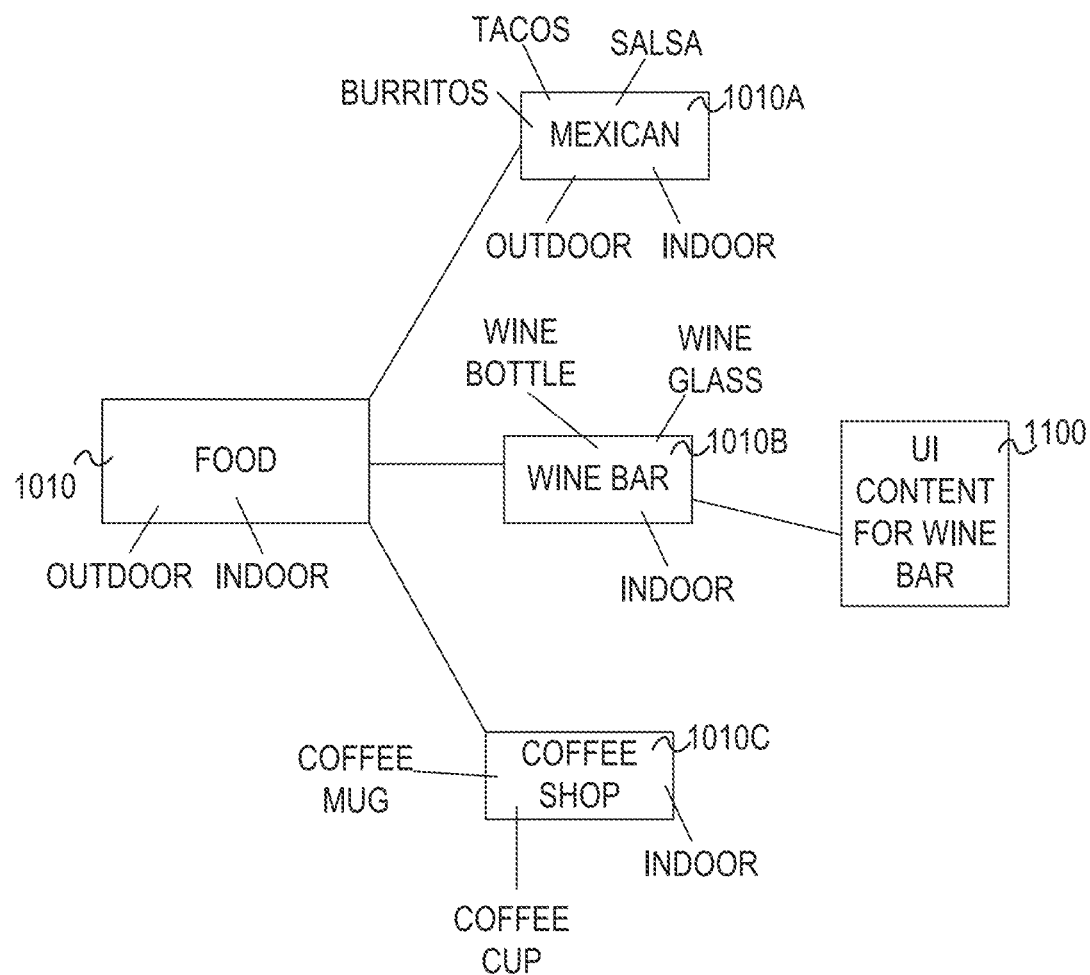
FIG. 11 shows an example of metadata tags with a portion of the data structure, according to some example embodiments.

FIG. 11 shows an example of metadata tags with a portion of the data structure, according to some example embodiments. In particular, the food category 1010 is displayed with its associated subcategories including a Mexican restaurant food subcategory 1010A, a wine bar subcategory 1010B, and a coffee shop subcategory 1010C. Each of the categories and subcategories have metadata tags that describe the corresponding data object. The tags can be used for filtering and selecting venues as discussed in FIG. 9. As illustrated, the food category has both the indoor and outdoor tags because food venues can be outdoors, indoors, or both (indoor restaurant with an outdoor patio). Likewise, the subcategories also have environment tags indicating whether the venues are indoor, outdoor, or both. The sub-categories have additional tags that further describe characteristics or objects likely to be detected (e.g., by the object classification engine 620); e.g., the wine bar 1010B has a wine bottle tag and a wine glass tag. When a detected object matches a given tag, the venue may be selected as discussed in FIG. 9.

Further, each of the categories and sub-categories may have associated or referenced UI content that indicates the category or sub-category venue type. For example, as illustrated, the wine bar sub-category 1010B is linked to UI content 1100 (e.g., avatars, captions) that correspond to the type of associated category or sub-category. Examples of UI content are shown in FIGS. 12-14.

Figure 12:
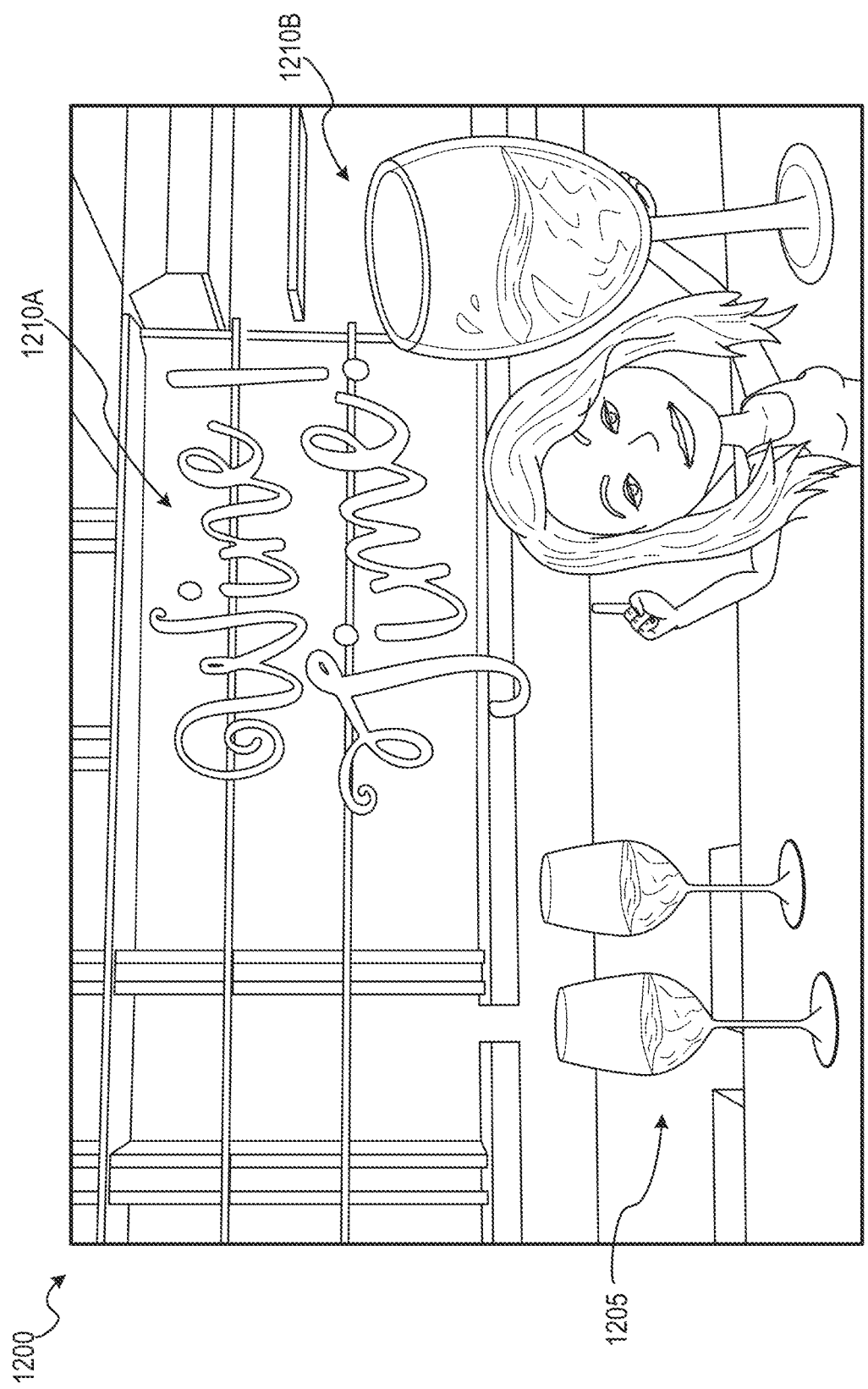
FIG. 12 shows an example presentation of an image of a wine bar with overlay content, according to some example embodiments.

FIG. 12 shows an example presentation of an image 1200 of a wine bar with overlay content 1210A and 1210B, according to some example embodiments. In the example of FIG. 12, the client venue system 210 determined that the user (e.g., the human user taking a picture of the wine bar with client device 102) is in an indoor environment and has further detected wine glasses 1205 in the image 1200. The client venue system selects then wine bar subcategory using the above methods 700-900 and data structure 1000. In response to the wine bar selection, associated UI content 1100 is retrieved and overlaid on the image 1200. In particular, as illustrated, the female avatar 1210B of the user with the caption "Wine Time!" 1210A is overlaid on the wine bar image 1200. In some example embodiments, the UI content integrated into the image is three-dimensional (e.g., a dancing cartoon hotdog that appears to dance on the wine bar counter top).

Figure 13:
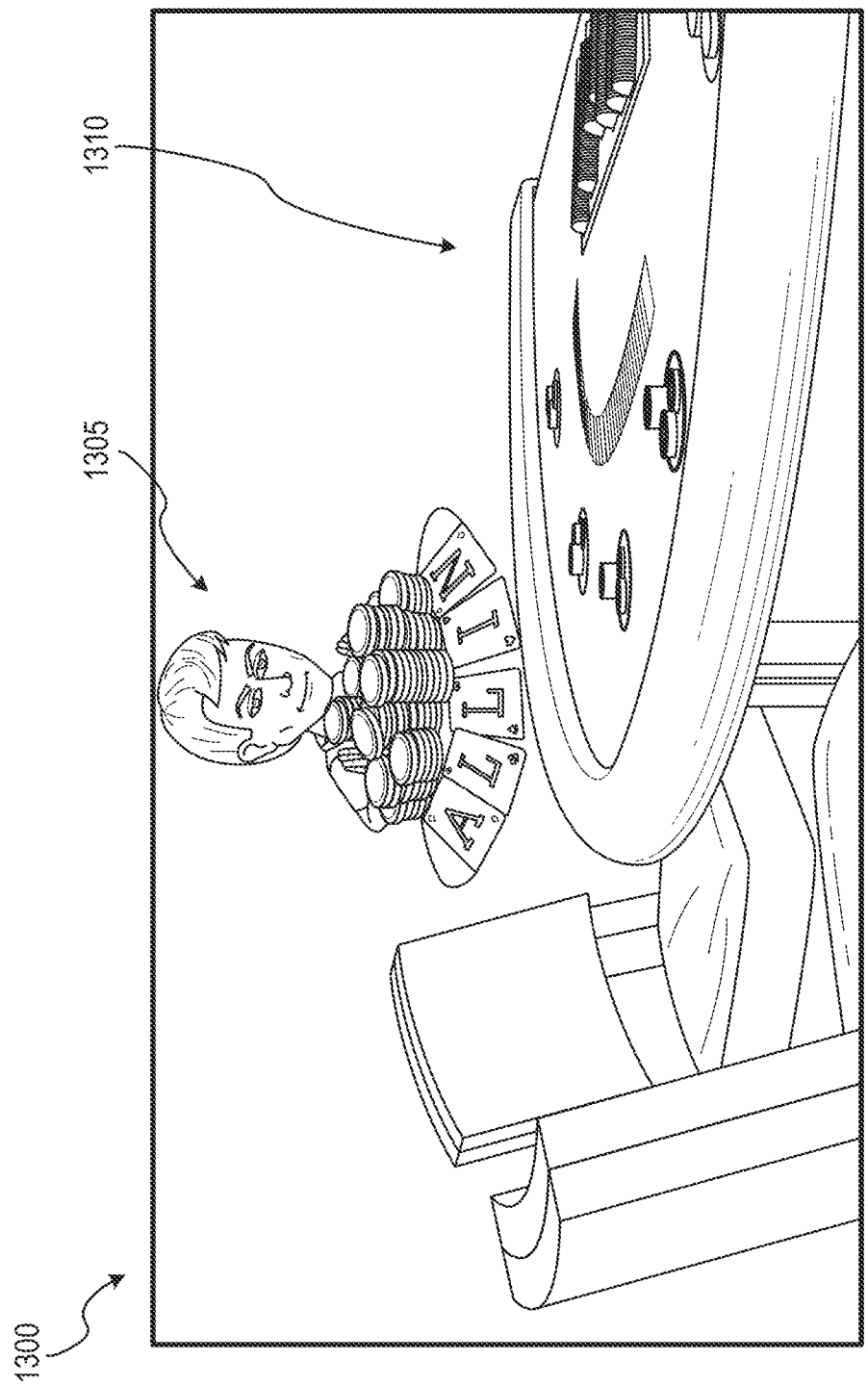
FIG. 13 shows an example presentation of a casino with overlay content, according to some example embodiments.

FIG. 13 shows an example presentation of an image 1300 of a casino with overlay content 1305, according to some example embodiments. In the example shown in FIG. 13, the user captured an image of the casino and the client venue system 210 implemented the approaches discussed above to determine that the image is of an indoor environment and further that the image 1300 depicts casino chips and/or a green felt table (e.g., a card game table). Responsive to the determinations, the client venue system selects an indoor casino environment integrates the overlay content 1305 (a cartoon avatar of the user gambling) onto the image 1300.

Figure 14:
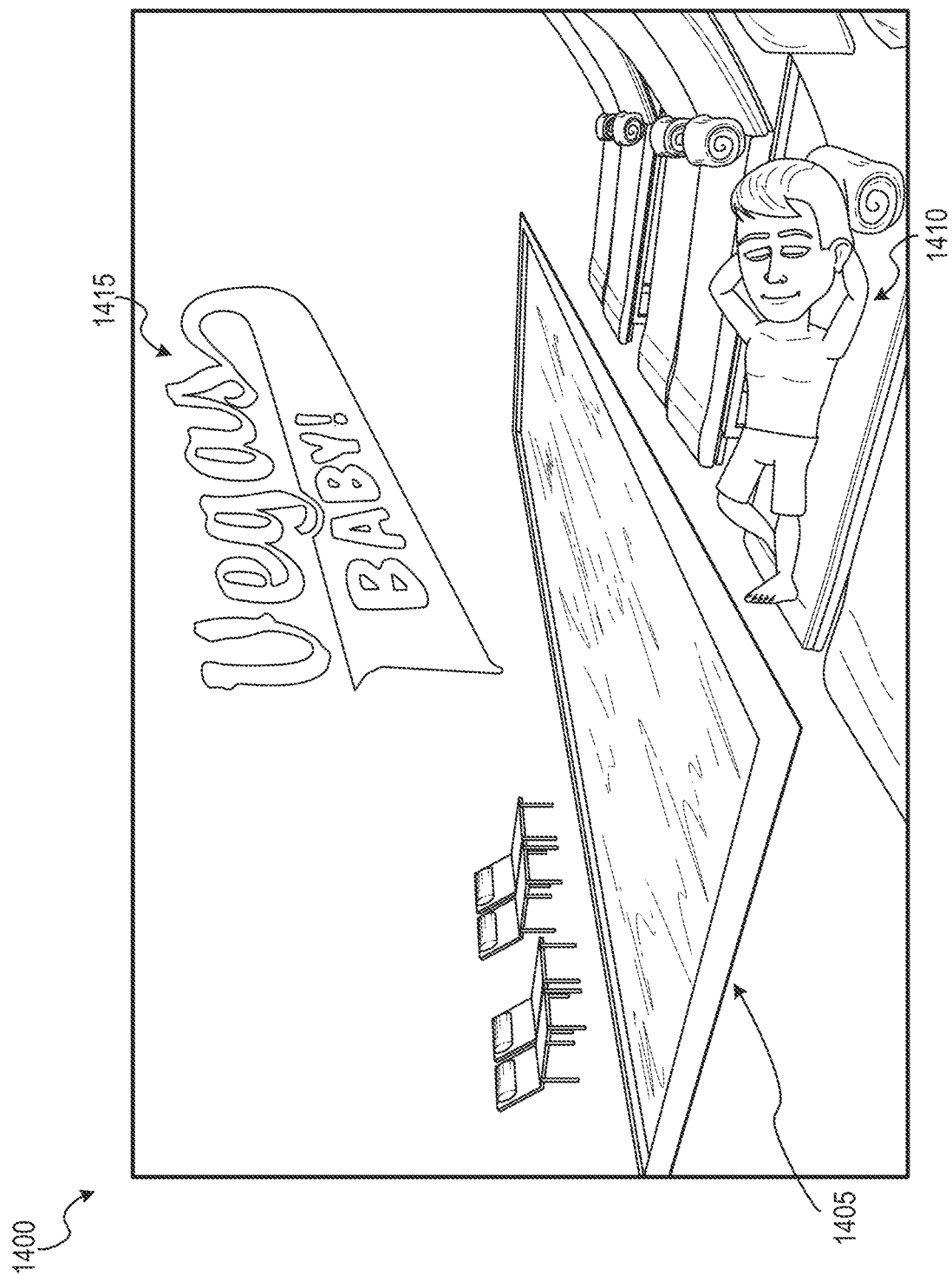
FIG. 14 shows an example presentation of a pool area with overlay content, according to some example embodiments.

FIG. 14 shows an example presentation 1400 of a pool area with overlay content, according to some example embodiments. In the example of FIG. 14, the client venue system 210 may determine that the user is at the casino, but outside the building (according to environmental data). Further, the object classification engine 620 identified a pool 1405. Responsive to the determinations, the client venue system 210 selects outdoor content for the casino venue and overlays it on image 1400. In particular, a caption "Vegas Baby!" 1415 and a reclining male avatar 1410 of the user is displayed on image 1400.

The presentations displayed in FIG. 12-14 can then be published to a social network as an ephemeral message 502, as discussed above. In this way, the venue system disclosed herein implements visual cues, logic, and a specific data structure that allow a client device to quickly and more accurately and quickly determine a current venue, and publish a venue-customized ephemeral message while the user is in or near the venue.

Figure 15:
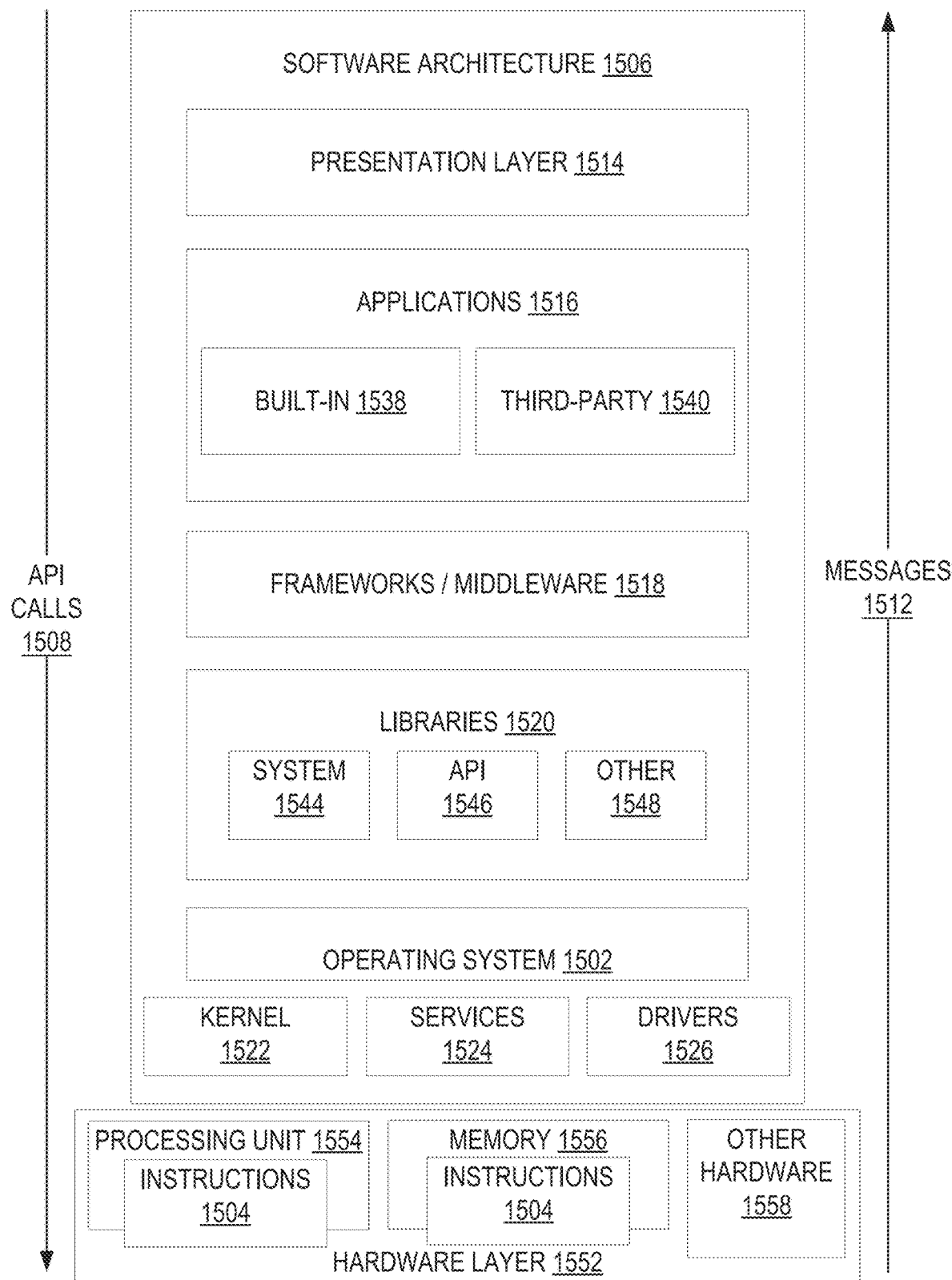
FIG. 15 is a block diagram illustrating a representative software architecture, which may be used in conjunction with various hardware architectures herein described.

FIG. 15 is a block diagram illustrating an example software architecture 1506, which may be used in conjunction with various hardware architectures herein described. FIG. 15 is a non-limiting example of a software architecture, and it will be appreciated that many other architectures may be implemented to facilitate the functionality described herein. The software architecture 1506 may execute on hardware such as a machine 1600 of FIG. 16 that includes, among other things, processors, memory, and I/O components. A representative hardware layer 1552 is illustrated and can represent, for example, the machine 1600 of FIG. 16. The representative hardware layer 1552 includes a processing unit 1554 having associated executable instructions 1504. The executable instructions 1504 represent the executable instructions of the software architecture 1506, including implementation of the methods, components, and so forth described herein. The hardware layer 1552 also includes a memory/storage 1556, which also has the executable instructions 1504. The hardware layer 1552 may also comprise other hardware 1558.

In the example architecture of FIG. 15, the software architecture 1506 may be conceptualized as a stack of layers where each layer provides particular functionality. For example, the software architecture 1506 may include layers such as an operating system 1502, libraries 1520, frameworks/middleware 1518, applications 1516, and a presentation layer 1514. Operationally, the applications 1516 and/or other components within the layers may invoke API calls 1508 through the software stack and receive a response in the form of messages 1512. The layers illustrated are representative in nature and not all software architectures have all layers. For example, some mobile or special-purpose operating systems may not provide a frameworks/middleware 1518, while others may provide such a layer. Other software architectures may include additional or different layers.

The operating system 1502 may manage hardware resources and provide common services. The operating system 1502 may include, for example, a kernel 1522, services 1524, and drivers 1526. The kernel 1522 may act as an abstraction layer between the hardware and the other software layers. For example, the kernel 1522 may be responsible for memory management, processor management (e.g., scheduling), component management, networking, security settings, and so on. The services 1524 may provide other common services for the other software layers. The drivers 1526 are responsible for controlling or interfacing with the underlying hardware. For instance, the drivers 1526 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1520 provide a common infrastructure that is used by the applications 1516 and/or other components and/or layers. The libraries 1520 provide functionality that allows other software components to perform tasks in an easier fashion than by interfacing directly with the underlying operating system 1502 functionality (e.g., kernel 1522, services 1524, and/or drivers 1526). The libraries 1520 may include system libraries 1544 (e.g., C standard library) that may provide functions such as memory allocation functions, string manipulation functions, mathematical functions, and the like. In addition, the libraries 1520 may include API libraries 1546 such as media libraries (e.g., libraries to support presentation and manipulation of various media formats such as MPEG4, H.264, MP3, AAC, AMR, JPG, or PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1520 may also include a wide variety of other libraries 1548 to provide many other APIs to the applications 1516 and other software components/modules.

The frameworks/middleware 1518 provide a higher-level common infrastructure that may be used by the applications 1516 and/or other software components/modules. For example, the frameworks/middleware 1518 may provide various graphic user interface (GUI) functions, high-level resource management, high-level location services, and so forth. The frameworks/middleware 1518 may provide a broad spectrum of other APIs that may be utilized by the applications 1516 and/or other software components/modules, some of which may be specific to a particular operating system 1502 or platform.

The applications 1516 include built-in applications 1538 and/or third-party applications 1540. Examples of representative built-in applications 1538 may include, but are not limited to, a contacts application, a browser application, a book reader application, a location application, a media application, a messaging application, and/or a game application. The third-party applications 1540 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1540 may invoke the API calls 1508 provided by the mobile operating system (such as the operating system 1502) to facilitate functionality described herein.

The applications 1516 may use built-in operating system functions (e.g., kernel 1522, services 1524, and/or drivers 1526), libraries 1520, and frameworks/middleware 1518 to create user interfaces to interact with users of the system. Alternatively, or additionally, in some systems, interactions with a user may occur through a presentation layer, such as the presentation layer 1514. In these systems, the application/component "logic" can be separated from the aspects of the application/component that interact with a user.

Figure 16:
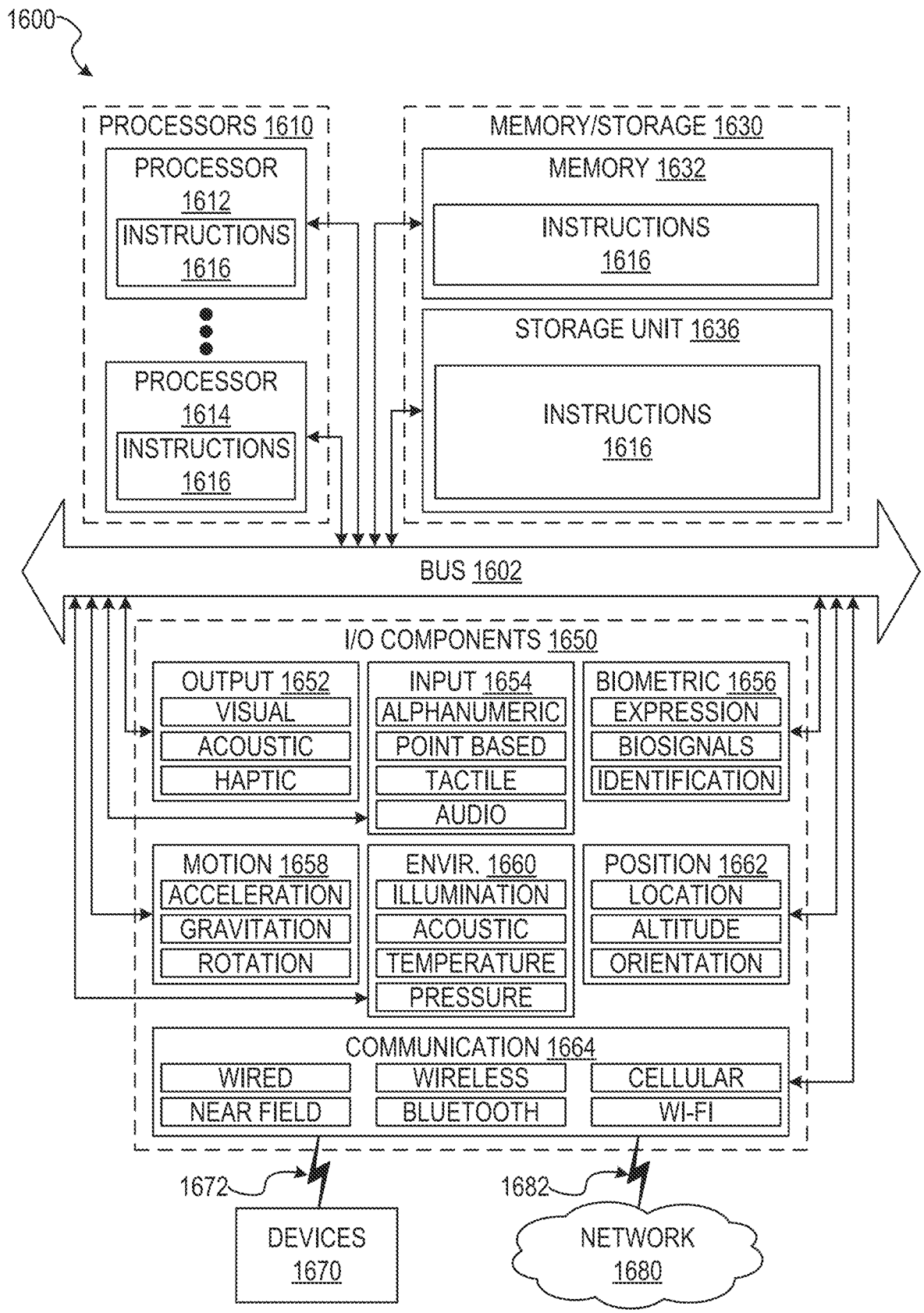
FIG. 16 is a block diagram illustrating components of a machine, according to some example embodiments, able to read instructions from a machine-readable medium (e.g., a machine-readable storage medium) and perform any one or more of the methodologies discussed herein.

FIG. 16 is a block diagram illustrating components of a machine 1600, according to some example embodiments, able to read instructions from a machine-readable medium (e.g., a machine-readable storage medium) and perform any one or more of the methodologies discussed herein. Specifically, FIG. 16 shows a diagrammatic representation of the machine 1600 in the example form of a computer system, within which instructions 1616 (e.g., software, a program, an application, an applet, an app, or other executable code) for causing the machine 1600 to perform any one or more of the methodologies discussed herein may be executed. As such, the instructions 1616 may be used to implement modules or components described herein. The instructions 1616 transform the general, non-programmed machine 1600 into a particular machine 1600 programmed to carry out the described and illustrated functions in the manner described. In alternative embodiments, the machine 1600 operates as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1616, sequentially or otherwise, that specify actions to be taken by the machine 1600. Further, while only a single machine 1600 is illustrated, the term "machine" shall also be taken to include a collection of machines that individually or jointly execute the instructions 1616 to perform any one or more of the methodologies discussed herein.

The machine 1600 may include processors 1610, memory/storage 1630, and I/O components 1650, which may be configured to communicate with each other such as via a bus 1602. The memory/storage 1630 may include a memory 1632, such as a main memory, or other memory storage, and a storage unit 1636, both accessible to the processors 1610 such as via the bus 1602. The storage unit 1636 and memory 1632 store the instructions 1616 embodying any one or more of the methodologies or functions described herein. The instructions 1616 may also reside, completely or partially, within the memory 1632, within the storage unit 1636, within at least one of the processors 1610 (e.g., within the processor cache memory accessible to processor units 1612 or 1614), or any suitable combination thereof, during execution thereof by the machine 1600. Accordingly, the memory 1632, the storage unit 1636, and the memory of the processors 1610 are examples of machine-readable media.

The I/O components 1650 may include a wide variety of components to receive input, provide output, produce output, transmit information, exchange information, capture measurements, and so on. The specific I/O components 1650 that are included in a particular machine 1600 will depend on the type of machine. For example, portable machines such as mobile phones will likely include a touch input device or other such input mechanisms, while a headless server machine will likely not include such a touch input device. It will be appreciated that the I/O components 1650 may include many other components that are not shown in FIG. 16. The I/O components 1650 are grouped according to functionality merely for simplifying the following discussion and the grouping is in no way limiting. In various example embodiments, the I/O components 1650 may include output components 1652 and input components 1654. The output components 1652 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 1654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1650 may include biometric components 1656, motion components 1658, environment components 1660, or position components 1662 among a wide array of other components. For example, the biometric components 1656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1658 may include acceleration sensor components (e.g., accelerometer), gravitation sensor components, rotation sensor components (e.g., gyroscope), and so forth. The environment components 1660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1662 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1650 may include communication components 1664 operable to couple the machine 1600 to a network 1680 or devices 1670 via a coupling 1682 and a coupling 1672, respectively. For example, the communication components 1664 may include a network interface component or other suitable device to interface with the network 1680. In further examples, the communication components 1664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1670 may be another machine or any of a wide variety of peripheral devices (e.g., a peripheral device coupled via a USB).

Moreover, the communication components 1664 may detect identifiers or include components operable to detect identifiers. For example, the communication components 1664 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF418, Ultra Code, UCC RSS-2D barcode, and other optical codes), or acoustic detection components (e.g., microphones to identify tagged audio signals). In addition, a variety of information may be derived via the communication components 1664, such as location via Internet Protocol (IP) geolocation, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions 1616 for execution by the machine 1600, and includes digital or analog communications signals or other intangible media to facilitate communication of such instructions 1616. Instructions 1616 may be transmitted or received over the network 1680 using a transmission medium via a network interface device and using any one of a number of well-known transfer protocols.

"CLIENT DEVICE" in this context refers to any machine 1600 that interfaces to a communications network 1680 to obtain resources from one or more server systems or other client devices 102. A client device 102 may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network 1680.

"COMMUNICATIONS NETWORK" in this context refers to one or more portions of a network 1680 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network 1680 may include a wireless or cellular network and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EPHEMERAL MESSAGE" in this context refers to a message 400 that is accessible for a time-limited duration. An ephemeral message 502 may be a text, an image, a video, and the like. The access time for the ephemeral message 502 may be set by the message sender. Alternatively, the access time may be a default setting or a setting specified by the recipient. Regardless of the setting technique, the message 400 is transitory.

"MACHINE-READABLE MEDIUM" in this context refers to a component, a device, or other tangible media able to store instructions 1616 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions 1616. The term "machine-readable medium" shall also be taken to include any medium, or combination of multiple media, that is capable of storing instructions 1616 (e.g., code) for execution by a machine 1600, such that the instructions 1616, when executed by one or more processors 1610 of the machine 1600, cause the machine 1600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor 1612 or a group of processors 1610) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine 1600) uniquely tailored to perform the configured functions and are no longer general-purpose processors 1610. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor 1612 configured by software to become a special-purpose processor, the general-purpose processor 1612 may be configured as respectively different special-purpose processors (e.g., comprising different hardware components) at different times. Software accordingly configures a particular processor 1612 or processors 1610, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 1610 that are temporarily configured (e.g., by software) or permanently configured to perform the relevant operations. Whether temporarily or permanently configured, such processors 1610 may constitute processor-implemented components that operate to perform one or more operations or functions described herein. As used herein, "processor-implemented component" refers to a hardware component implemented using one or more processors 1610. Similarly, the methods described herein may be at least partially processor-implemented, with a particular processor 1612 or processors 1610 being an example of hardware. For example, at least some of the operations of a method may be performed by one or more processors 1610 or processor-implemented components. Moreover, the one or more processors 1610 may also operate to support performance of the relevant operations in a "cloud computing" environment or as a "software as a service" (SaaS). For example, at least some of the operations may be performed by a group of computers (as examples of machines 1600 including processors 1610), with these operations being accessible via a network 1680 (e.g., the Internet) and via one or more appropriate interfaces (e.g., an API). The performance of certain of the operations may be distributed among the processors 1610, not only residing within a single machine 1600, but deployed across a number of machines 1600. In some example embodiments, the processors 1610 or processor-implemented components may be located in a single geographic location (e.g., within a home environment, an office environment, or a server farm). In other example embodiments, the processors 1610 or processor-implemented components may be distributed across a number of geographic locations.

"PROCESSOR" in this context refers to any circuit or virtual circuit (a physical circuit emulated by logic executing on an actual processor 1612) that manipulates data values according to control signals (e.g., "commands," "op codes," "machine code," etc.) and which produces corresponding output signals that are applied to operate a machine 1600. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor 1610 may further be a multi-core processor 1610 having two or more independent processors 1612, 1614 (sometimes referred to as "cores") that may execute instructions 1616 contemporaneously.

"TIMESTAMP" in this context refers to a sequence of characters or encoded information identifying when a certain event occurred, for example giving date and time of day, sometimes accurate to a small fraction of a second.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2017, SNAP INC., All Rights Reserved.

What is claimed is:

1. A computer-implemented method for identifying a venue at a location, the method comprising:
   capturing an image using a camera of a mobile computing device;
   providing the captured image to a first machine learning model, wherein the first machine learning model classifies an environment depicted in the image as either an indoor environment or an outdoor environment;
   providing the captured image to a second machine learning model, wherein the second machine learning model outputs one or more venue identifiers based on characteristics of the venue depicted in the image;
   selecting a venue from a list of potential venues based on the outputs from the first and second machine learning models;
   displaying information related to the selected venue on a display of the mobile computing device.

2. The method of claim 1, wherein the first machine learning model is a convolutional neural network trained on a dataset comprising images of various indoor and outdoor environments.

3. The method of claim 1, wherein the second machine learning model is trained to recognize visual cues that are indicative of specific types of venues.

4. The method of claim 1, further comprising:
   receiving user input confirming or correcting the selected venue;
   updating a database based on the user input to improve the accuracy of the machine learning models.

5. The method of claim 1, wherein the venue is selected based on a highest confidence score from the second machine learning model that exceeds a predetermined threshold.

6. The method of claim 1, wherein the mobile computing device further comprises a GPS sensor, and the method further comprises refining the list of potential venues based on a geographic location provided by the GPS sensor.

7. The method of claim 1, wherein the information displayed on the mobile computing device includes at least one of: directions to the selected venue, hours of operation of the selected venue, or promotional offers available at the selected venue.

8. A system for identifying a venue at a location, the system comprising:
   one or more processors;
   one or more memory storage devices storing instructions thereon, which, when executed by the one or more processors, cause the one or more processors to perform operations comprising:
   capturing an image using a camera of the system;
   providing the captured image to a first machine learning model, wherein the first machine learning model classifies an environment depicted in the image as either an indoor environment or an outdoor environment;
   providing the captured image to a second machine learning model, wherein the second machine learning model outputs one or more venue identifiers based on characteristics of the venue depicted in the image;
   selecting at least one venue from a list of potential venues based on the outputs from the first and second machine learning models;
   displaying information related to the selected at least one venue on a display of the system.

9. The system of claim 8, wherein the first machine learning model is a convolutional neural network trained on a dataset comprising images of various indoor and outdoor environments.

10. The system of claim 8, wherein the second machine learning model is trained to recognize visual cues that are indicative of specific types of venues.

11. The system of claim 8, further comprising:
    receiving user input confirming or correcting the selected at least one venue;
    updating a database based on the user input to improve the accuracy of the machine learning models.

12. The system of claim 8, wherein the at least one venue is selected based on a highest confidence score from the second machine learning model that exceeds a predetermined threshold.

13. The system of claim 8, wherein the system further comprises a GPS sensor, and the operations further comprise: refining the list of potential venues based on a geographic location provided by the GPS sensor.

14. The system of claim 8, wherein the information displayed on the system includes at least one of: directions to the selected venue, hours of operation of the selected venue, or promotional offers available at the selected venue.

15. A system for identifying a venue at a location, the system comprising:
    means for capturing an image using a camera of a mobile computing device;
    means for providing the captured image to a first machine learning model, wherein the first machine learning model classifies an environment depicted in the image as either an indoor environment or an outdoor environment;
    means for providing the captured image to a second machine learning model, wherein the second machine learning model outputs one or more venue identifiers based on characteristics of the venue depicted in the image;
    means for selecting a venue from a list of potential venues based on the outputs from the first and second machine learning models;
    means for displaying information related to the selected venue on a display of the mobile computing device.

16. The system of claim 15, wherein the first machine learning model is a convolutional neural network trained on a dataset comprising images of various indoor and outdoor environments.

17. The system of claim 15, wherein the second machine learning model is trained to recognize visual cues that are indicative of specific types of venues.

18. The system of claim 15, further comprising:
    receiving user input confirming or correcting the selected venue;
    updating a database based on the user input to improve the accuracy of the machine learning models.

19. The system of claim 15, wherein the venue is selected based on a highest confidence score from the second machine learning model that exceeds a predetermined threshold.

20. The system of claim 15, wherein the mobile computing device further comprises a GPS sensor, and the system further comprises refining the list of potential venues based on a geographic location provided by the GPS sensor.

* * * * *